US006252611B1

United States Patent
Kondo

(10) Patent No.: US 6,252,611 B1
(45) Date of Patent: Jun. 26, 2001

(54) STORAGE DEVICE HAVING PLURAL MEMORY BANKS CONCURRENTLY ACCESSIBLE, AND ACCESS METHOD THEREFOR

(75) Inventor: Tetsujiro Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/121,419

(22) Filed: Jul. 23, 1998

(30) Foreign Application Priority Data

Jul. 30, 1997 (JP) .................................................. 9-204373

(51) Int. Cl.[7] ........................................................ G06F 5/76
(52) U.S. Cl. ............................ 345/516; 345/508; 382/240
(58) Field of Search .................................. 345/501–503, 345/521, 507, 508, 509, 515, 516; 382/232, 240, 302

(56) References Cited

U.S. PATENT DOCUMENTS

| 5,241,658 |   | 8/1993  | Masterson et al. .................. 345/509 |
|-----------|---|---------|--------------------------------------------|
| 5,373,375 | * | 12/1994 | Weldy ................................. 358/523 |
| 5,586,200 | * | 12/1996 | Devaney et al. ..................... 382/232 |
| 5,675,826 | * | 10/1997 | Manze et al. ........................ 712/13 |
| 5,745,607 | * | 4/1998  | Maeda ................................. 382/240 |
| 5,748,787 | * | 5/1998  | Sugiyama ........................... 382/240 |
| 5,848,194 | * | 12/1998 | Ishizuka et al. ..................... 382/234 |
| 5,859,667 |   | 1/1999  | Kondo et al. ........................ 348/414 |
| 5,867,593 | * | 2/1999  | Fukuda et al. ....................... 382/176 |
| 5,889,927 | * | 3/1999  | Suzuki ................................ 395/102 |
| 5,930,394 |   | 7/1999  | Kondo et al. ........................ 382/232 |
| 5,959,676 |   | 9/1999  | Kondo et al. ........................ 348/421 |

FOREIGN PATENT DOCUMENTS

| 0 538 056 | 4/1993 | (EP) . |
| 0 778 576 | 6/1997 | (EP) . |
| 0 785 688 | 7/1997 | (EP) . |

OTHER PUBLICATIONS

L. Wang, *Reduced–difference pyramid: a data structure for progressive image transmission*, Optical Engineering, Jul. 1999, vol. 28, No. 7, pp 708–716.

* cited by examiner

*Primary Examiner*—Ulka J. Chauhan
(74) *Attorney, Agent, or Firm*—Frommer Lawrence & Haug, LLP; William S. Frommer; Glenn F. Savit

(57) ABSTRACT

A storage device and access method for performing hierarchical coding without the need for employing a circuit for a line delay, in addition to a memory for storing an image. Each of first and second memories is divided into two banks, a bank A and a bank B. A first layer pixel stored at the bank A in the first memory is read while a second layer pixel stored at the bank A in the second memory is read, and by subtracting the first layer pixel from the second layer pixel, a first pixel is finally determined and is written onto the bank A in the second memory that stored the second layer pixel. At the same time, a first layer pixel stored at the bank B in the first memory is read while a first layer pixel stored at the bank B in the second memory is read, and by summing these first layer pixels, the original second layer pixel is determined and the value stored at the bank B address in the second memory, which is the first layer pixel, is then rewritten to the original second layer pixel.

14 Claims, 9 Drawing Sheets

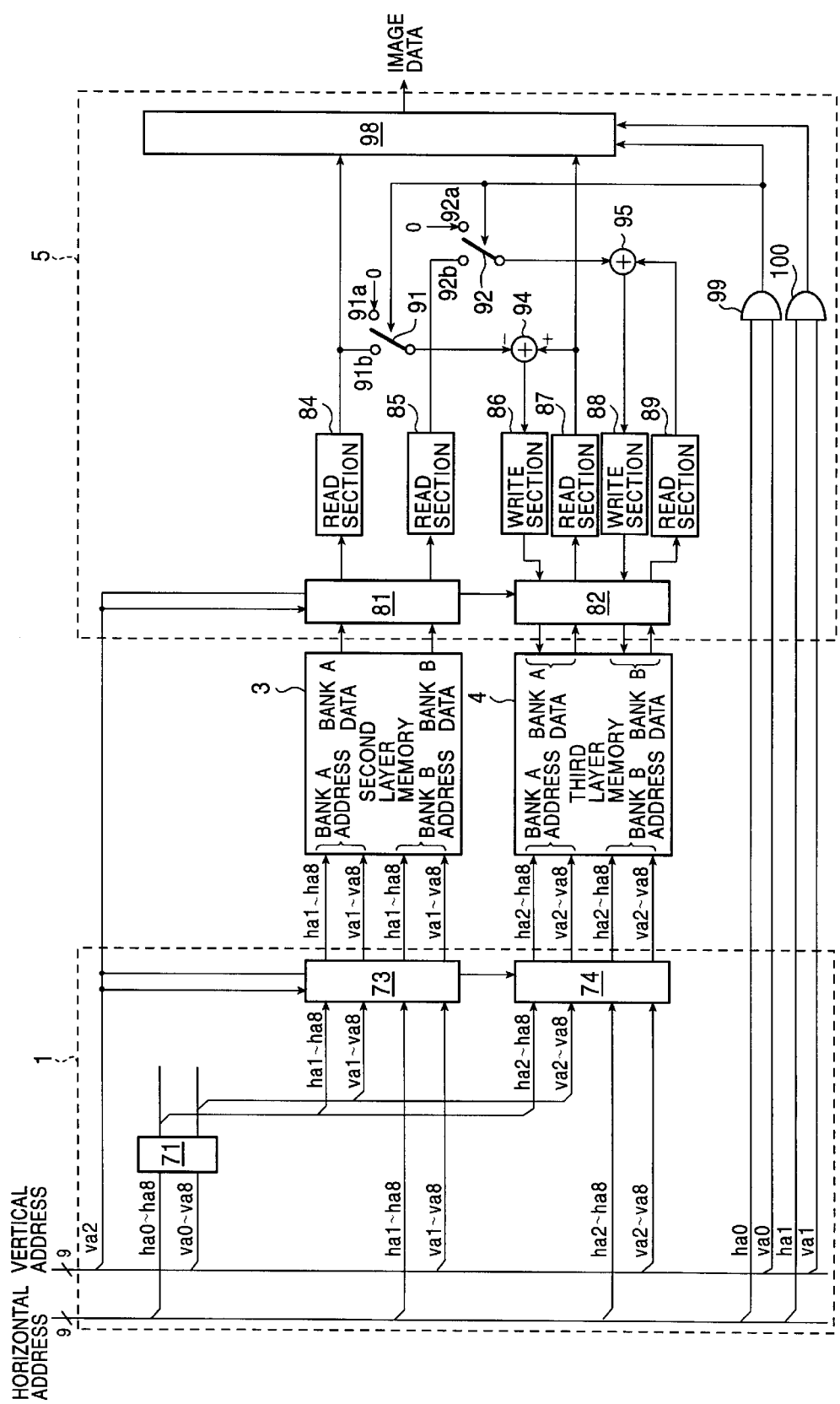

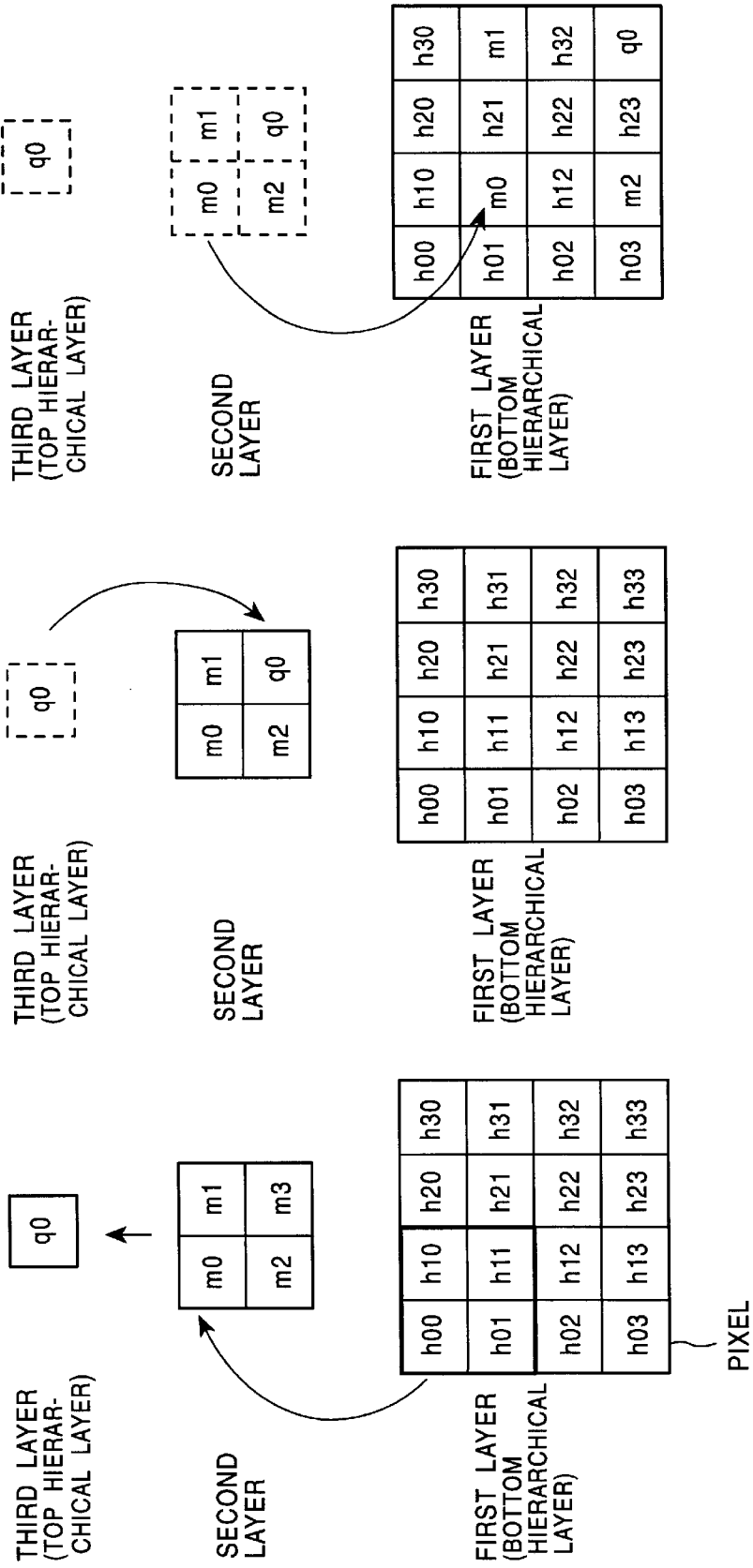

STORAGE DEVICE HAVING PLURAL MEMORY BANKS CONCURRENTLY ACCESSIBLE, AND ACCESS METHOD THEREFOR

BACKGROUND OF THE INVENTION

1. Field of the Invention

The present invention relates to a storage device and an access method and, more particularly, to a storage device and an access method which are preferably used in hierarchical coding which divides an image into a plurality of layers having different numbers of pixels.

2. Description of the Related Art

In one of the presently available coding methods, a high-definition image (bottom hierarchical or first layer data) is used to form image data of a second layer having a smaller number of pixels, the second layer image data is then used to form image data of a third layer having an even smaller number of pixels, and this process is repeated until image data of top layer is formed. This type of a coding method is called hierarchical coding, in which image data of each layer is presented on a monitor in accordance with respective definition (the number of pixels). A user thus watches the image data by selecting the image data, which matches the definition of the user's own monitor, out of the hierarchically coded image data.

The image data of one definition is treated as the bottom hierarchical (first) layer image data to form image data of higher layers sequentially. When all of these data are stored and transmitted as they are, extra memory capacity and extra data transmission capacity for the higher layer image data are additionally required compared with the case when the bottom layer image data only is stored or transmitted.

The inventors of this invention have already proposed a hierarchical coding method to restrict an increase in the memory capacity.

For example, suppose now that the sum of four pixels of 2×2 (rows×columns) is treated as a higher hierarchical pixel (a pixel value) in a hierarchical coding of three layers. Referring to FIG. 9A, 8×8 pixels are now considered as an image of the bottom hierarchical layer, and the sum m0 of the top left four pixels, 2×2 pixels, h00, h10, h01, and h11 is computed, and the sum m0 is then treated as the top left pixel in a second layer. In the same way, the sum m1 of the top right four pixels h20, h30, h21, and h31, the sum m2 of the bottom left four pixels h02, h12, h03, and h13, and the sum m3 of the bottom right four pixels h22, h32, h23, and h33 in the bottom hierarchical layer are respectively computed, and these sums are respectively treated the top right, the bottom left and bottom right pixels in the second layer. The sum q0 of the four pixels m0, m1, m2, and m3 as 2×2 pixels in the second layer is computed, and the sum is a pixel of an image in the top hierarchical layer.

If the pixels h00 through h33, m0 through m3, and q0 are all stored, the extra memory capacity for the pixels m0 through m3 in the second layer and the pixel q0 in the third layer will be additionally required.

Referring to FIG. 9B, the pixel q0 in the third layer is positioned, for example, in place of the bottom right pixel m3, out of the second layer pixels m0 through m3. The second layer is thus constructed of the pixels m0 through m2 and q0.

Referring to FIG. 9C, the pixel m0 in the second layer is positioned, for example, in place of the bottom left pixel h11, out of the first layer pixels h00, h10, h01, and h11, all these used to determine the pixel m0 in the second layer. Similarly, the remaining pixels m1, m2, and q0 in the second layer are substituted for the pixels h31, h13, and h33 in the first layer. Although the pixel q0 is not directly derived from the pixels h22, h32, h23, and h33, the pixel q0 is substituted for the pixel m3 which is directly derived from these pixel, and the pixel q0 is thus positioned instead of the pixel m3 in place of the pixel h33.

In this way, referring to FIG. 9C, the total number of pixels is 16 of 4×4 pixels, and remains unchanged from the number of pixels in the bottom hierarchical layer shown in FIG. 9A. An increase in the memory capacity is thus prevented.

The pixels m3 and h33, replaced with the pixel q0, and pixels h11, h31 and h13, respectively replaced with the pixels m0 through m2, are decoded as follows.

Since q0 is the sum of m0 through m3, equation q0=m0+m1+m2+m3 holds. The pixel m3 is determined from equation m3=q0−(m0+m1+m2).

m0 is the sum of h00, h10, h01 and h11, equation m0=h00+h10+h01+h11 holds. h11 is thus determined from equation h11=m0−(h00+h10+h01). Similarly, h31, h13, and h33 are determined. h33 is determined after the determination of m3.

In the above hierarchical coding, a delay circuit for line delay of the first layer pixel (pixel value) was conventionally required besides a general-purpose memory for storing the hierarchical coding results (such as SRAM (Static Random Access Memory) or DRAM (Dynamic RAM)).

For example, referring to FIG. 9C, equation h11=m0−(h00+h10+h01) needs to be computed to determine, in the first layer, the pixel h11, if h11 is not stored. Pixels h00 and h10 on a first line and pixels h01 and m0 on a second line are necessary to compute h11. Suppose that the image data is read from a memory line by line from top to bottom, and the computing of the pixel h11 has to wait for the line starting with h01, namely, wait for pixels m0, h00, h10, and h01 required to compute the pixel h11, with the line starting with h00 delayed by one line.

Besides the memory for storing the hierarchical coding results, the delay circuit for line delay of the image data is conventionally required, causing the device bulky.

OBJECT AND SUMMARY OF THE INVENTION

Accordingly, it is an object of the present invention to make the device compact.

According to one aspect of the present invention, the storage device comprises a first memory which has addresses corresponding to pixels for input image data and a memory area of which is divided into a plurality of blocks, wherein the blocks are addressable on a block by block basis; an addressing module for concurrently addressing the blocks of the first memory according to, at least, first and second address signals; and a read and write module for concurrently reading from and writing to addresses, designated by the first and second address signals, in the blocks in the first memory.

According to another aspect of the present invention, the access method comprises the step of concurrently addressing the blocks in a memory according to, at least, first and second address signals and the step of performing concurrently reading from and writing to addresses, designated by the first and second address signals, in the blocks in the memory.

BRIEF DESCRIPTION OF THE DRAWINGS

FIG. 8 is a fifth functional block diagram of the storage device of FIG. 1; and

FIGS. 9A–9C illustrate a hierarchical coding process.

DESCRIPTION OF THE PREFERRED EMBODIMENTS

Figure 1:
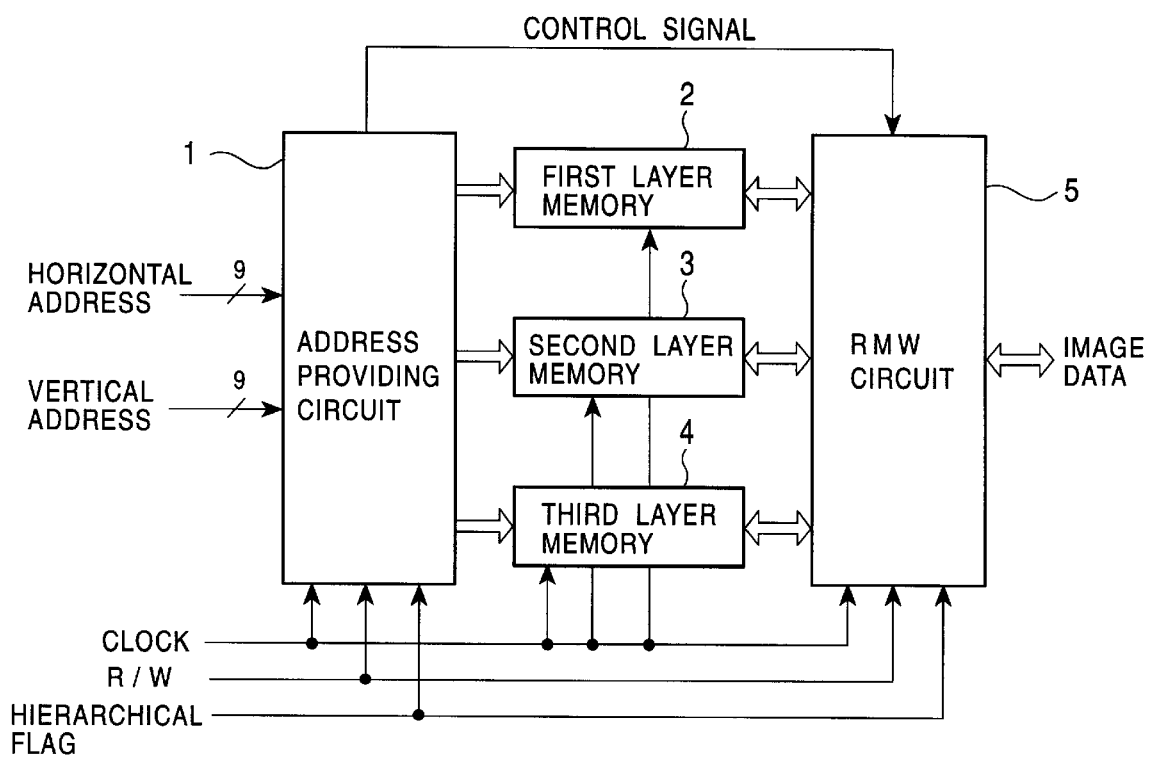
FIG. 1 is a block diagram showing the construction of one embodiment of a storage device of the present invention.

Referring now to the drawings, the embodiments of the present invention are discussed.

FIG. 1 shows the construction of one embodiment of the storage device that implements the present invention.

For example, the storage device is constructed of one chip CMOS (Complementary Metal Oxide Semiconductor), which is designed to perform the hierarchical coding to derive, for example, three layer images having different numbers of pixels from an image input thereon.

More specifically, an address providing circuit 1 is supplied with a horizontal address and a vertical address, namely addresses corresponding to the horizontal and vertical positions of each pixel for the image input to the storage device.

Figure 2:
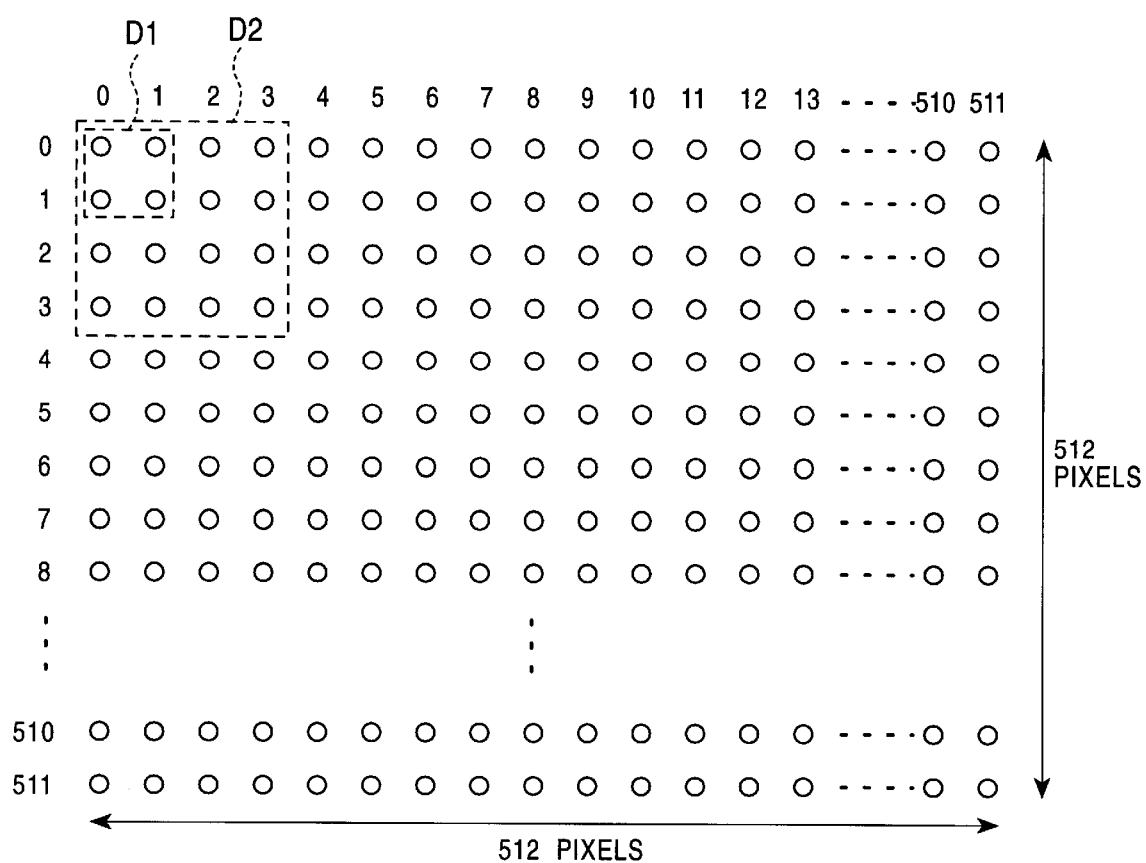
FIG. 2 shows the organization of one display screen for a first layer image.

In this embodiment of the present invention, as shown in FIG. 2, the address providing circuit 1 receives an image (digital image data) in a single display screen constructed of 512 pixels in a horizontal direction by 512 pixels in a vertical direction. Each of the horizontal address and vertical address is expressed in nine ($=\log_2 512$) bits.

The address providing circuit 1 processes the horizontal address and vertical address as necessary, and feeds them to a first layer memory 2, a second layer memory 3, and a third layer memory 4. The address providing circuit 1 is also supplied with a clock (not shown in FIGS. 3 through 6 and FIG. 8 to be described later), an R/W (Read/Write) signal, and a hierarchical flag, besides the horizontal and vertical addresses. The address providing circuit 1 provides an address to the first layer memory 2, second layer memory 3 and third layer memory 4 in synchronization with the clock. In response to the R/W signal and the hierarchical flag, the address providing circuit 1 processes the horizontal address and vertical address. Furthermore, the address providing circuit 1 provides a predetermined control signal to the RMW circuit 5 as necessary.

The R/W signal commands reading the image data from the storage device and writing the image data to the storage device, and the hierarchical signal commands which of a first layer image, a second layer image and a third layer image, to be discussed later, is read when the image stored in the storage device is read, and is for example, a two-bit flag. Since the writing of the image data is concurrently performed onto the first layer memory 2, second layer memory 3 and third layer memory 4, the hierarchical flag is ignored (ineffective) when the R/W signal indicates the writing. Since the readings from the first layer memory 2, second layer memory 3 and third layer memory 4 are individually performed, the hierarchical flag is effective during the reading only. However, it is also possible to read concurrently from the first layer memory 2, second layer memory 3, and third layer memory 4. In this case, the use of the hierarchical flag is not needed.

The first layer memory 2 stores the image data, fed by the RMW circuit 5, at an address designated by the address providing circuit 1, and reads the image data stored at the address and outputs it to the RMW circuit 5. The first layer memory 2 is designed to store the first layer image, namely, the image data input to the storage device, as is. The first layer memory 2 is designed to store at least the first layer image in one display screen, namely, the image data of 512×512 pixels as shown in FIG. 2. Each memory cell constituting the first layer memory 2 has at least a data length equal to the number of bits assigned to a pixel for the first layer image. More specifically, when a pixel for the first layer image is expressed in eight bits, for example, a memory cell constituting the first layer memory 2 has at least an eight-bit data length.

The second layer memory 3 stores the image data, fed by the RMW circuit 5, at an address designated by the address providing circuit 1, and reads the image data stored at the address and outputs it to the RMW circuit 5. The second layer memory 3 is designed to store the second layer image. More specifically, in the same way as described with reference to FIG. 9, a single pixel in the second layer is derived from four pixels of 2×2 (rows×columns) for the first layer image, and the second layer memory 3 is designed to store the second layer image constructed of such pixels. Furthermore, the second layer memory 3 has at least a memory capacity capable of storing the second layer image of one display screen. Specifically, since one pixel in the second layer is derived from 2×2 pixels in the first layer, the second layer of one display screen is constructed of 256×256 ($=512/2×512/2$) pixels. The second layer memory 2 is thus designed to store at least the second layer image having such number of pixels. Furthermore, each memory cell constituting the second layer memory 3 has at least a data length capable of storing a pixel for the second layer image without any missing digits. Specifically, since a pixel in the first layer is expressed in eight bits in this embodiment, a pixel in the second layer, which is the sum of four eight-bit pixels, is expressed in ten ($=\log_2 (2^8+2^8+2^8+2^8)$) bits. Each memory cell constituting the second layer memory 3 has at least a data length of ten bits.

The third layer memory 4 stores the image data, fed by the RMW circuit 5, at an address designated by the address providing circuit 1, and reads the image data stored at the address and outputs it to the RMW circuit 5. The third layer memory 4 is designed to store the third layer image. More specifically, in the same way as described with reference to FIG. 9, a single pixel in the third layer is derived from four pixels of 2×2 for the second layer image, namely, 4×4 pixels in the first layer, and the third layer memory 4 is designed to store the third layer image constructed of such pixels. Furthermore, the third layer memory 4 has at least a memory capacity capable of storing the third layer image of one display screen. Specifically, since one pixel in the third layer is derived from 2×2 pixels in the second layer, the second layer of one display screen is constructed of 128×128 ($=256/2×256/2$) pixels. The third layer memory 4 is thus designed to store at least the third layer image having such number of pixels. Furthermore, each memory cell constituting the third layer memory 4 has at least a data length capable of storing a pixel for the third layer image without any missing digits. Specifically, since a pixel in the second layer is expressed in ten bits in this embodiment, a pixel in the third layer, which is the sum of four ten-bit pixels, is expressed in 12 (=$\log_2$ ($2^{10}+2^{10}+2^{10}+2^{10}$) bits. Each memory cell constituting the third layer memory 4 has at least a data length of 12 bits.

The first layer memory 2, second layer memory 3 and third layer memory 4 are provided with the clock, and data reading and data writing are performed in synchronization with the clock.

The RMW circuit 5 is designed to write the image data, input to the storage device, onto the first layer memory 2 as a first layer image. The RMW circuit 5 also computes a second layer image from the first layer image, and writes it onto the second layer memory 3. Furthermore, the RMW circuit 5 computes a third layer image from the first layer image (or the second layer image), and writes it onto the third layer memory 4. The RMW circuit 5 reads image data respectively stored in the first layer memory 2, second layer memory 3 and third layer memory 4 and outputs the read image data. The RMW circuit 5 is provided with the clock, the R/W signal, the hierarchical flag and the control signal output by the address providing circuit 1, and performs a variety of processings in response to the R/W signal, the hierarchical signal and the control signal in synchronization with the clock.

Figure 3:
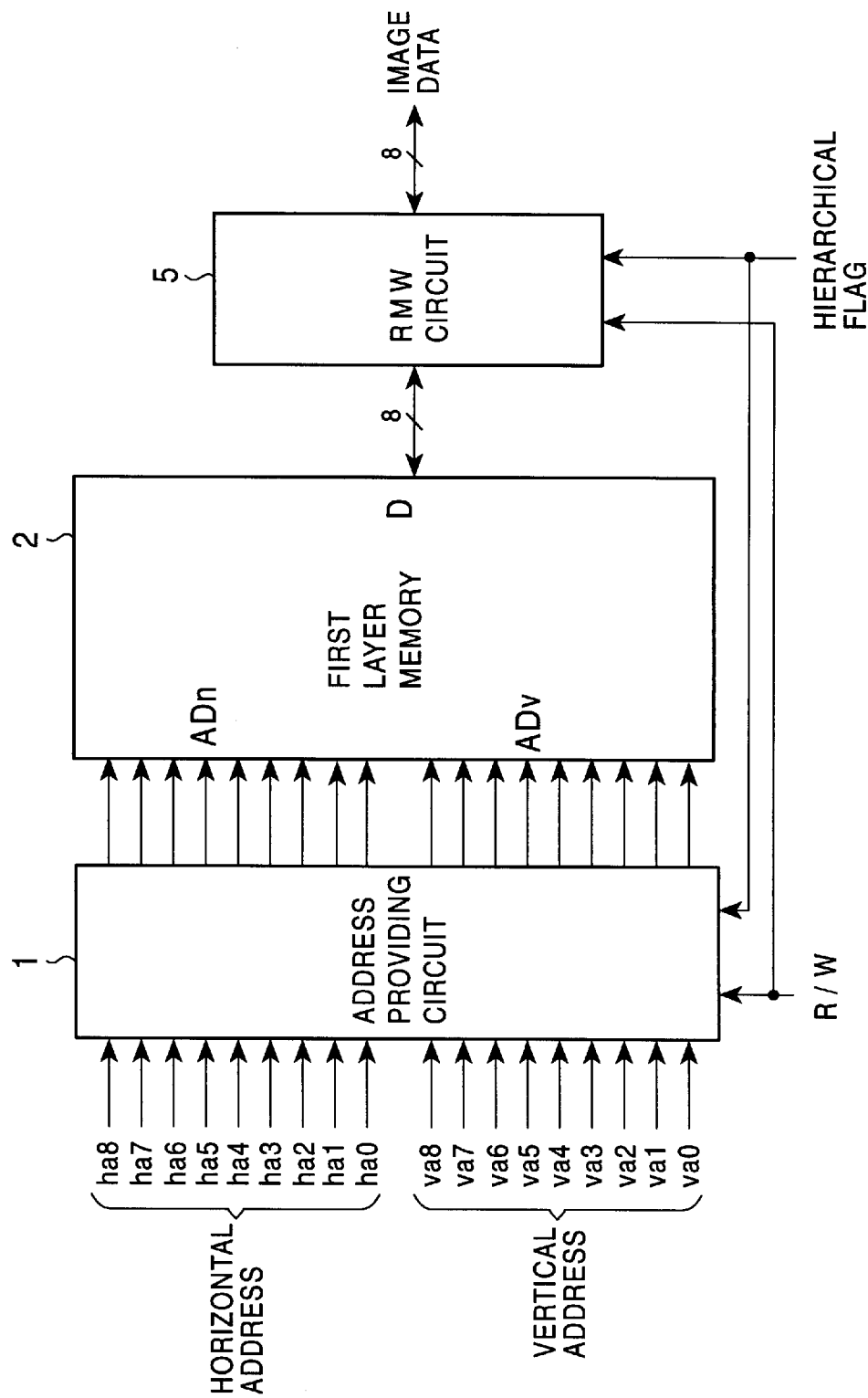
FIG. 3 is a first functional block diagram of the storage device of FIG. 1.
Figure 4:
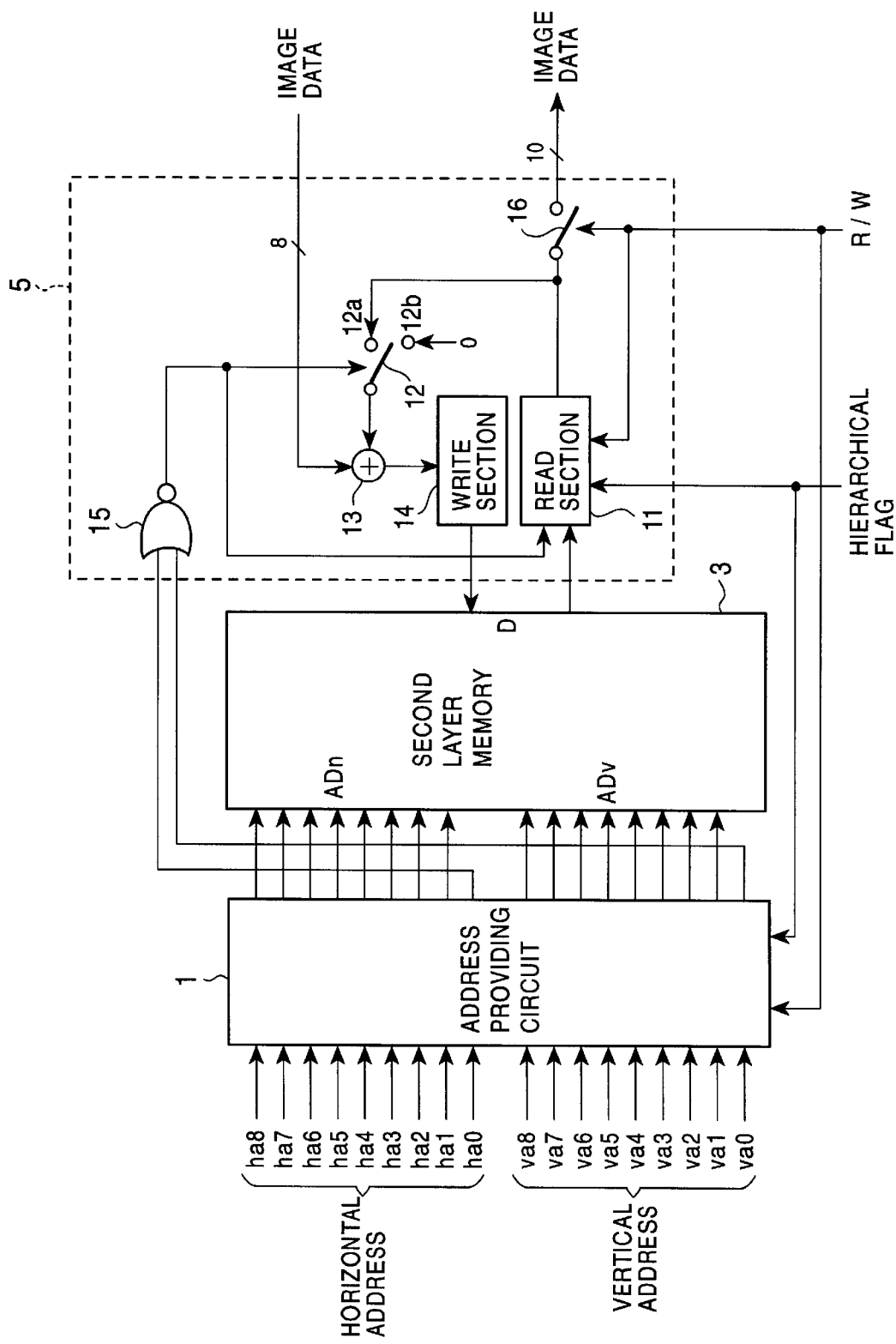
FIG. 4 is a second functional block diagram of the storage device of FIG. 1.
Figure 5:
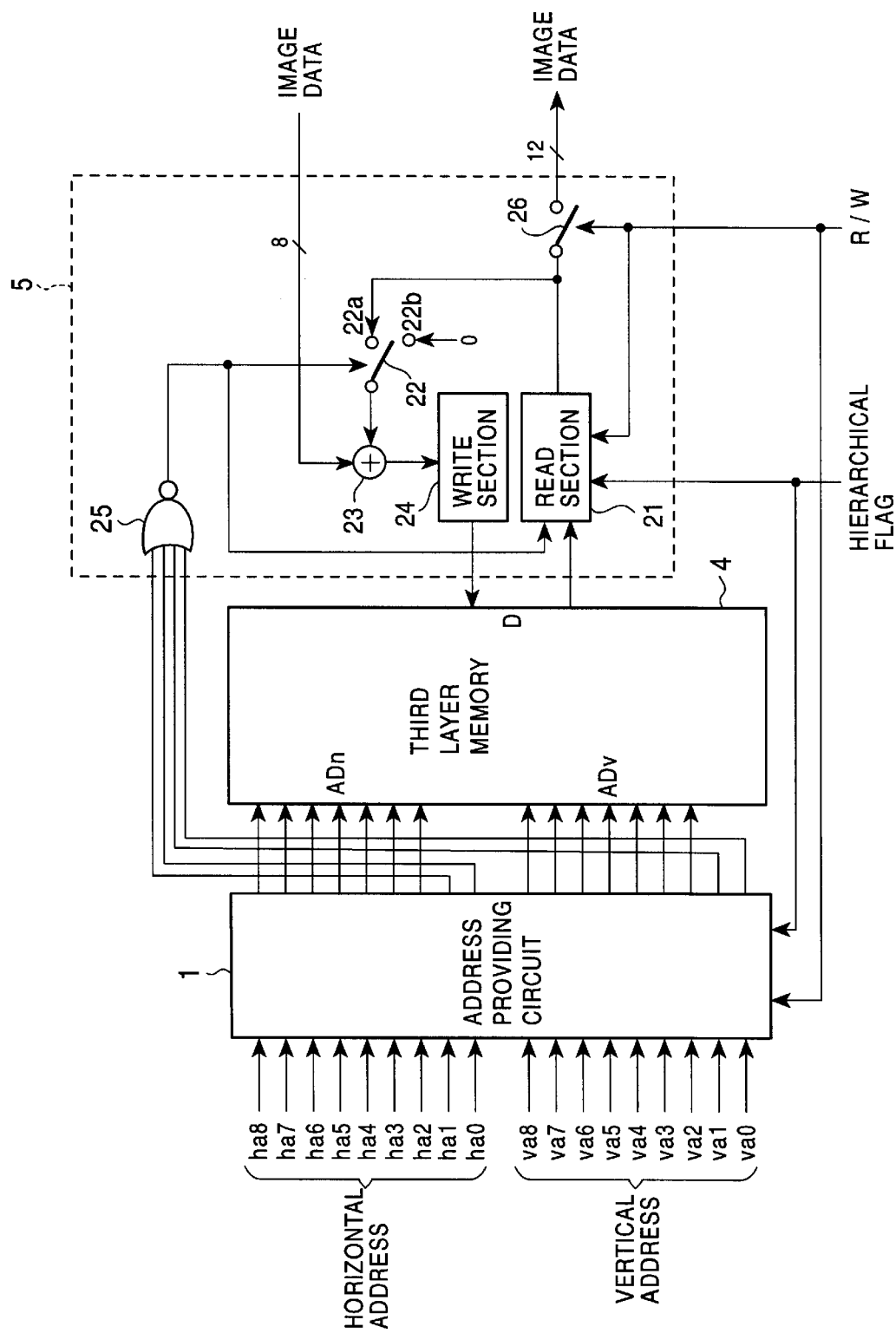
FIG. 5 is a third functional block diagram of the storage device of FIG. 1.

The operation of the storage device is now discussed referring to FIGS. 3 to 5.

As shown in FIG. 2, the image data of one display screen constructed of 512×512 pixels with each pixel expressed in eight bits is fed to the storage device as the first layer image. Now, suppose that the image data is sequentially scanned and supplied.

As for the pixels for the first layer image, let h(0,0) represent the top left pixel, and let h(x,y) represent a pixel at a (x+1)-th column from the left and at a (y+1)-th row from the top. Since the first layer image is constructed of 512×512 pixels, each of x and y takes an integer falling within a range of 0 to 511 (=$2^9-1$).

Now variables s and t, each taking an integer within the range from 0 to 255 (=$2^9/2-1$), are considered, and a pixel in the second layer is the sum of neighboring 2×2 pixels in the first layer, h(2s,2t), h(2s+1,2t), h(2s,2t+1), h(2s+1,2t+1), and this sum is now designated by m(s,t). The following equation holds.

$$m(s,t)=h(2s,2t)+h(2s+1,2t)+h(2s,2t+1)+h(2s+1,2t+1) \quad (1)$$

Now variables m and n, each taking an integer within the range from 0 to 127 (=$2^9/4-1$), are considered, and a pixel in the third layer is the sum of neighboring 2×2 pixels in the second layer, m(2m,2n), m(2m+1,2n), m(2m,2n+1), m(2m+1,2n+1), namely, is the sum of neighboring 4×4 pixels in the first layer, h(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), h(4m+3,4n+3), and the sum is now designated by q(m,n). The follow equations holds.

$$q(m,n)=m(2m,2n)+m(2m+1,2n)+m(2m,2n+1)+m(2m+1,2n+1)=$$
$$h(4m,4n)+h(4m+1,4n)+$$

$$h(4m+2,4n)+h(4m+3,4n)+h(4m,4n+1)+h(4m+1,4n+1)+h(4m+2,4n+1)+$$

$$h(4m+3,4n+1)+h(4m,4n+2)+h(4m+1,4n+2)+h(4m+2,4n+2)+$$

$$h(4m+3,4n+2)+h(4m,4n+3)+h(4m+1,4n+3)+h(4m+2,4n+3)+h(4m+3,4n+3) \quad (2)$$

During the data writing and data reading, the address providing circuit 1 is supplied with a combination of a horizontal address HA and a vertical address VA, (HA, VA), in synchronization with the clock, for example, in the following order (corresponding to the order of sequential scanning), (0,0), (1,0), . . . , (511,0), (0,1), (1,1), . . . , (511,1),

.
.
.

(0,511),(1, 511), . . . ,(511,511).

Now, let ha1, ha2, . . . , ha8 (ha8 being the most insignificant bit) represent the bits of the nine-bit horizontal address HA with ha0 representing the least significant bit, and let va1, va2, . . . , va8 (va8 being the most significant bit) represent the bits of the nine-bit vertical address VA with hb0 representing the least significant bit.

When the image data is written onto the storage device, the RMW circuit 5 is sequentially supplied with the first layer image in synchronization with the clock while the address providing circuit 1 is supplied with the horizontal address HA and the vertical address VA as described above.

The accessing to the first layer memory 2 is performed as follows.

Referring to FIG. 3, during a writing operation (when the R/W signal indicates a writing operation), the address providing circuit 1 feeds the horizontal address HA and the vertical address VA, supplied thereto, as is, to address terminals (ADh, ADv) of the first layer memory 2. The RMW circuit 5 writes the first layer image data, supplied thereto, to a memory cell (not shown) in the first layer memory 2 designated by the horizontal address HA and the vertical address VA. The same process step is repeated to store the first layer memory of one display screen constructed of 512×512 pixels in the first layer memory 2. In this way, in the addresses in the first layer memory 2

(0,0), (1,0), . . . , (511,0), (0,1), (1,1), . . . , (511,1),

.
.
.

(0,511), (1,511), . . . , (511,511), first layer pixels (pixel values)

h(0,0), h(1,0), . . . , h(511,0), h(0,1), h(1,1), . . . , h(511,1),

.
.
.

h(0,511),h(1,511), . . . ,h(511,511)

are respectively stored.

During a reading operation (when the R/W signal indicates the reading operation), the address providing circuit 1 feeds the horizontal address HA and the vertical address VA, supplied thereto, as they are, to the address terminals of the first layer memory 2 when the hierarchical flag indicates the first layer. The RMW circuit 5 reads the first layer image data stored in the memory cell in the first layer memory 2 designated by the horizontal address HA and the vertical address VA, and the same process step is repeated to read the first layer memory of one display screen constructed of 512×512 pixels from the first layer memory 2. In this way, the first layer image sequentially scanned is output.

The accessing to the second layer memory 3 is now discussed.

During a writing operation, the address providing circuit 1 feeds, to the address terminals of the second layer memory 3, for example, higher order eight bits ha1 through ha8, without the least significant bit ha0, as part of the horizontal address HA supplied thereto, and higher order eight bits va1 through va8, without the least significant bit va0, as part of the vertical address VA supplied thereto, as shown in FIG. 4. Furthermore, the address providing circuit 1 outputs the least significant bit ha0 of the horizontal address HA and the least significant bit va0 of the vertical address VA to the RMW circuit 5 as a control signal.

At the timing each of the four pixels 2×2 of h(2s,2t), h(2s+1,2t), h(2s,2t+1), and h(2s+1,2t+1) in the first layer represented by D1 as shown in FIG. 2 is fed to the RMW circuit 5, the address providing circuit 1 outputs a signal indicative of the same address (s,t) in the second layer memory 3.

On the other hand, in the RMW circuit 5, the first layer image data supplied thereto is input to an arithmetic unit 13. The arithmetic unit 13 receives an output from a switch 12 as well as the first layer image data, and sums them and feeds the sum to a write section 14.

The switch 12 selects between its terminal 12*a* and terminal 12*b* depending on an output from a NOR gate 15. The terminals 12*a* and 12*b* are supplied with an output of a read section 11 and 0, respectively. The NOR gate 15 receives both the least significant bit ha0 of the horizontal address HA and the least significant bit va0 of the vertical address VA from the address providing circuit 1. Its output is at an H level only when both the least significant bits ha0 and va0 are 0, namely, at the timing the top left pixel h(2s,2t) of the 2×2 pixels h(2s, 2t), h(2s+1,2t), h(2s,2t+1), and h(2s+1,2t+1) in the first layer is supplied to the arithmetic unit 13, and is at an L level in the remainder of the time.

The switch 12 is designed to select between its terminal 12*a* and terminal 12*b* depending on whether the output of the NOR gate 15 is at an L level or at an H level.

The read section 11 reads data (storage data) stored at the address corresponding to a signal output by the address providing circuit 1.

At the timing the top left pixel h(2s,2t) of the 2×2 pixels h(2s, 2t), h(2s+1,2t), h(2s,2t+1), and h(2s+1,2t+1) in the first layer is fed to the arithmetic unit 13, the read section 11 reads the data stored at the address (s,t) in the second layer memory 3, and outputs it to the terminal 12*a*. Since both the least significant bit ha0 of the horizontal address HA and the least significant bit va0 of the vertical address VA are 0, the output of the NOR gate 15 is driven to an H level, causing the switch 12 to select its terminal 12*b*.

As a result, 0 is fed to the arithmetic unit 13 through the switch 12.

The arithmetic unit 13 sums the 0 and the pixel h(2s,2t) in the first layer, and the resulting sum (0+h(2s,2t)) is fed to the write section 14. The write section 14 writes the output of the arithmetic unit 13 to the address corresponding to the output of the address providing circuit 1, namely, the address (s,t) in the second layer memory 3.

At the timing the pixel h(2s+1,2t) right to the top left pixel h(2s,2t) of the 2×2 pixels h(2s, 2t), h(2s+1,2t), h(2s,2t+1), and h(2s+1,2t+1) in the first layer is fed to the arithmetic unit 13, the read section 11 reads the data (here, 0+h(2s,2t)) stored at the address (s,t) in the second layer memory 3, and outputs it to the terminal 12*a*.

Since the least significant bit ha0 of the horizontal address HA is a 1 with the least significant bit va0 of the vertical address VA being 0, the output of the NOR gate 15 is driven to an L level, causing the switch 12 to select its terminal 12*a*.

As a result, the arithmetic unit 13 receives the data (storage data) read by the read section 11 (here, 0+h(2s,2t)) through the switch 12.

The arithmetic unit 13 sums the data supplied through the switch 12 and the pixel h(2s+1,2t) in the first layer, and the resulting sum (0+h(2s,2t)+h(2s+1,2t)) is fed to the write section 14. The write section 14 writes the output of the arithmetic unit 13 to the address corresponding to the output of the address providing circuit 1, namely, the address (s,t) in the second layer memory 3.

The supplying of the image data on a 2t+1 line from the top starts. At the timing the bottom left pixel h(2s,2t+1) of the 2×2 pixels h(2s, 2t), h(2s+1,2t), h(2s,2t+1), and h(2s+1,2t+1) in the first layer is fed to the arithmetic unit 13, the read section 11 reads the data (here, 0+h(2s,2t)+h(2s+1,2t)) stored at the address (s,t) in the second layer memory 3, and outputs it to the terminal 12*a*.

Since the least significant bit ha0 of the horizontal address HA is a 0 with the least significant bit va0 of the vertical address VA being a 1, the output of the NOR gate 15 is driven to an L level, causing the switch 12 to select its terminal 12*a*.

As a result, the arithmetic unit 13 receives the data (storage data) read by the read section 11 (here, 0+h(2s,2t)+h(2s+1,2t)) through the switch 12.

The arithmetic unit 13 sums the data supplied through the switch 12 and the pixel h(2s,2t+1) in the first layer, and the resulting sum (0+h(2s,2t)+h(2s+1,2t)+h(2s,2t+1)) is fed to the write section 14. The write section 14 writes the output of the arithmetic unit 13 to the address corresponding to the output of the address providing circuit 1, namely, the address (s,t) in the second layer memory 3.

At the timing the pixel h(2s+1,2t+1) right to the bottom left pixel h(2s,2t+1) of the 2×2 pixels h(2s, 2t), h(2s+1,2t), h(2s,2t+1), and h(2s+1,2t+1) in the first layer is fed to the arithmetic unit 13, the read section 11 reads the data (here, 0+h(2s,2t)+h(2s+1,2t)+h(2s,2t+1)) stored at the address (s,t) in the second layer memory 3, and outputs it to the terminal 12*a*.

Since both the least significant bit ha0 of the horizontal address HA and the least significant bit va0 of the vertical address VA are a 1, the output of the NOR gate 15 is driven to an L level, causing the switch 12 to select its terminal 12*a*.

As a result, the arithmetic unit 13 receives the data (storage data) read by the read section 11 (here, 0+h(2s,2t)+h(2s+1,2t)+h(2s,2t+1)) through the switch 12.

The arithmetic unit 13 sums the data supplied through the switch 12 and the pixel h(2s+1,2t+1) in the first layer, and the resulting sum (0+h(2s,2t)+h(2s+1,2t)+h(2s,2t+1)+h(2s+1,2t+1)) is fed to the write section 14. The write section 14 writes the output of the arithmetic unit 13 to the address corresponding to the output of the address providing circuit 1, namely, the address (s,t) in the second layer memory 3.

The second layer memory 3 finally stores the sum expressed by equation h(2s,2t)+h(2s+1,2t)+h(2s,2t+1)+h (2s+1,2t+1), namely, the second layer pixel (pixel value) m(s,t) expressed by equation (1).

In this way, the second layer memory 3 stores the second layer image constructed of one display screen of 256×256 pixels.

As described above, the first layer image data is written onto the address (HA,VA) in the first layer memory 2, designated by the horizontal address HA and the vertical address VA. The storage data stored is read from the address in the second layer memory, designated by ha1 through ha8 and va1 through va8, parts of the horizontal address HA and the vertical address VA. The storage data and the image data in the first layer are summed, and the sum (first processed data) is written onto the address in the first layer memory 2 which stored the storage data. With this arrangement, the image data in the first layer is stored while the image data in the second layer is generated and stored at the same time. In summary, the second layer image data is obtained on a real-time basis.

Since the second layer memory 3 for storing the second layer image performs the function of the circuit for the conventional line delay, there is no need for such a circuit, and a compact design is implemented in the storage device.

The reading of the second layer image from the second layer memory 3 is now discussed.

During a reading operation, the address providing circuit 1 feeds, to the address terminals of the second layer memory 2, for example, higher order eight bits ha1 through ha8 of the horizontal address HA or higher order eight bits va1 through va8 of the vertical address VA, supplied thereto, when the hierarchical flag indicates the second layer, while outputting the least significant bit ha0 and the least significant bit va0 to the RMW circuit 5 as a control signal.

In the RMW circuit 5, the read section 11 receives the hierarchical flag, the R/W signal and the output of the NOR gate 15. With the R/W signal indicating the reading operation and the hierarchical flag indicating the second layer, the read section 11 reads and outputs the image data stored at the address in the second layer corresponding to the signal output by the address providing circuit 1 only when the output of the NOR gate 15 is at an H level.

From the above discussion, when the combination of the horizontal address HA and the vertical address VA is one of (2s,2t), (2s+1,2t), (2s,2t+1), and (2s+1,2t+1), the address providing circuit 1 outputs the same address (s,t) to the second layer memory 3. If data is simply read from the address in the second layer memory 3 corresponding to the signal output by the address providing circuit 1, the same data is read repeatedly four times.

For this reason, the read section 11 is designed to read the pixel (pixel value) m(s,t) in the second layer from the address (s,t) in the second layer memory 3 only when the combination of the horizontal address HA and the vertical address VA is (2s,2t), for example, out of (2s,2t), (2s+1,2t), (2s,2t+1), and (2s+1,2t+1), namely, when the output of the NOR gate 15 is at an H level.

The image data in the second layer read by the read section 11 is fed to a switch 16. The switch 16 is turned on only when the R/W signal indicates the reading operation and is turned off in the remainder of the time. Since the switch 16 is now turned on, the image data in the second layer read by the read section 11 is output via the switch 16.

In this way, the stored second layer image of one display screen constructed of 256×256 pixels is read from the second layer memory 3. A sequentially scanned second layer image is thus output.

The accessing to the third layer memory 4 is now discussed.

During a writing operation, the address providing circuit 1 feeds, to the address terminals of the third layer memory 4, for example, higher order seven bits ha2 through ha8, without lower order bits ha0 and ha1, as part of the horizontal address HA supplied thereto, and higher order seven bits va2 through va8, without lower order bits va0 and va1, as part of the vertical address VA supplied thereto, as shown in FIG. 5. Furthermore, the address providing circuit 1 outputs both the lower order bits ha0 and ha1 of the horizontal address HA and the lower order bits va0 and va1 of the vertical address VA to the RMW circuit 5 as a control signal.

At the timing each of 16 pixels of 4×4 of h(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), and h(4m+3,4n+3)

in the first layer represented by D2 as shown in FIG. 2 is fed to the RMW circuit 5, the address providing circuit 1 outputs a signal indicative of the same address (s,t) in the third layer memory 4.

On the other hand, in the RMW circuit 5, the first layer image data supplied thereto is input to an arithmetic unit 23. The arithmetic unit 23 receives an output from a switch 22 as well as the first layer image data, and sums them and feeds the sum to a write section 24.

The switch 22 selects between its terminal 22a and terminal 22b depending on an output from a NOR gate 25. The terminals 22a and 22b are supplied with an output of a read section 21 and 0, respectively. The NOR gate 25 receives both the lower order bits ha0 and ha1 of the horizontal address HA and the lower order bits va0 and va1 of the vertical address VA from the address providing circuit 1. Its output is at an H level only when the lower order bits ha0 and ha1 and va0 and va1 are 0's, namely, at the timing the top left pixel h(4m,2n) of the 4×4 pixels h(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), and h(4m+3,4n+3)

in the first layer, is supplied to the arithmetic unit 23, and is at an L level in the remainder of the time.

The switch 22 is designed to select its terminal 22a or 22b depending on whether the output of the NOR gate 25 is at an H level or an L level.

The read section 21 reads data (storage data) stored at the address corresponding to a signal output by the address providing circuit 1.

At the timing the pixel h(4m,4n) in the first layer is fed to the arithmetic unit 23, the read section 21 reads the data stored at the address (m,n) in the third layer memory 4, and outputs it to the terminal 22a. Since the lower order bits ha0 and ha1 of the horizontal address HA and the lower order bits va0 and va1 of the vertical address VA are all 0's, the output of the NOR gate 25 is driven to an H level, causing the switch 22 to select its terminal 22b.

As a result, 0 is fed to the arithmetic unit 23 through the switch 22.

The arithmetic unit 23 sums the 0 and the pixel h(4m,4n) in the first layer, and the resulting sum (0+h(4m,4n)) is fed to the write section 24. The write section 24 writes the output of the arithmetic unit 23 to the address corresponding to the signal output by the address providing circuit 1, namely, the address (m,n) in the third layer memory 4.

At the timing the pixel h(4m+1,4n) right to the pixel h(4m,4n) in the first layer is fed to the arithmetic unit 23, the read section 21 reads the data (here, 0+h(4m,4n)) stored at the address (m,n) in the third layer memory 4, and outputs it to the terminal 22a.

Since the lower order bits ha0 and ha1 of the horizontal address HA are respectively a 1 and a 0 with the lower order bits va0 and va1 of the vertical address VA being respectively 0, the output of the NOR gate 25 is driven to an L level, causing the switch 22 to select its terminal 22a.

As a result, the arithmetic unit 23 receives the data (storage data) read by the read section 21 (here, 0+h(4m,4n)) through the switch 22.

The arithmetic unit 23 sums the data supplied through the switch 22 and the pixel h(4m+1,4n) in the first layer, and the resulting sum (0+h(4m,4n)+h(4m+1,4n)) is fed to the write section 24. The write section 24 writes the output of the arithmetic unit 23 to the address corresponding to the signal output by the address providing circuit 1, namely, the address (m,n) in the third layer memory 4.

At the timing the pixel h(4m+2,4n) right to the pixel h(4m+1,4n) in the first layer is fed to the arithmetic unit 23, the read section 21 reads the data (here, 0+h(4m,4n)+h(4m+1,4n)) stored at the address (m,n) in the third layer memory 4, and outputs it to the terminal 22a.

Since the lower order two bits ha0 and ha1 of the horizontal address HA are respectively a 0 and a 1 with the lower order two bits va0 and va1 of the vertical address VA being respectively 0, the output of the NOR gate 25 is driven to an L level, causing the switch 22 to select its terminal 22a.

As a result, the arithmetic unit 23 receives the data (storage data) read by the read section 21 (here, 0+h(4m,4n)+h(4m+1,4n)) through the switch 22.

The arithmetic unit 23 sums the data supplied through the switch 22 and the pixel h(4m+2,4n) in the first layer, and the resulting sum (0+h(4m,4n)+h(4m+1,4n)+h(4m+2,4n)) is fed to the write section 24. The write section 24 writes the output of the arithmetic unit 23 to the address corresponding to the signal output by the address providing circuit 1, namely, the address (m,n) in the third layer memory 4.

At the timing each of pixels h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), and h(4m+3,4n+3)

in the first layer is fed to the arithmetic unit 23, the same process step as described above is carried out, and the address (m,n) in the third layer memory 4 finally stores the pixel (pixel value) q(m,n) in the third layer memory 4 expressed by equation (2).

In this way, the third layer memory 4 stores the third layer image constructed of one display screen of 128×128 pixels.

The first layer image data is stored while the second layer image data and the third layer image data are generated and stored at the same time. In summary, the second and third layer image data are obtained on a real-time basis.

Since the third layer memory 4 for storing the third layer image performs the function of the circuit for the conventional line delay, there is no need for such a circuit, and a compact design is implemented in the storage device.

The reading of the third layer image from the third layer memory 4 is now discussed.

During a reading operation, the address providing circuit 1 feeds, to the address terminals of the second layer memory 3, for example, higher order seven bits ha2 through ha8 of the horizontal address HA or higher order seven bits va2 through va8 of the vertical address VA, supplied thereto, when the hierarchical flag indicates the third layer, while outputting the lower order two bits ha0 and ha1 and the lower order two bits va0 and va1 to the RMW circuit 5 as the control signal.

The read section 21 receives the hierarchical flag, the R/W signal and the output of the NOR gate 25 in the RMW circuit 5. With the R/W signal indicating the reading operation and the hierarchical flag indicating the third layer, the read section 21 reads and outputs the image data stored at the address in the third layer corresponding to the signal output by the address providing circuit 1 only when the output of the NOR gate 25 is at an H level.

From the above discussion, when the combination of the horizontal address HA and the vertical address VA is one of h(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), and h(4m+3,4n+3), the address providing circuit 1 outputs the same address (m,n) at each of the combinations. If data is simply read from the address in the third layer memory 4 corresponding to the signal output by the address providing circuit 1, the same data is read repeatedly 16 times.

For this reason, the read section 21 reads the pixel (pixel value) m(m,n) in the third layer from the address (m,n) in the third layer memory 4 only when the combination of the horizontal address HA and the vertical address VA is (4m,4n), namely, when the output of the NOR gate 25 is at an H level.

The image data in the third layer read by the read section 21 is fed to a switch 26. The switch 26 is turned on only when the R/W signal indicates the reading operation and is turned off in the remainder of the time. Since the switch 26 is now turned on, the image data in the third layer read by the read section 21 is output via the switch 26.

In this way, the stored third layer image of one display screen constructed of 128×128 pixels is read from the RMW circuit 5. A sequentially scanned third layer image is thus output.

The reading of the image data in the second layer from the second layer memory 3 is performed as described above. Alternatively, the reading of the image data may be performed by allowing the address providing circuit 1 to present the lower order eight bits ha0 through ha7 of the horizontal address HA and the lower order eight bits va0 through va7 of the vertical address VA, as the address in the second layer memory 3. Similarly, the reading of the image in the third layer from the third layer memory 4 may be performed by allowing the address providing circuit 1 to present the lower order seven bits ha0 through ha6 of the horizontal address HA and the lower order seven bits va0 through va6 of the vertical address VA, as the address in the third layer memory 4.

As already described with reference to FIG. 9, one of the neighboring 2×2 pixels h(2s,2t), h(2s+1,2t), h(2s,2t+1), and h(2s+1,2t+1) in the first layer, for example, the right bottom pixel h(2s+1,2t+1), is determined from the remaining pixels h(2s,2t), h(2s+1,2t), h(2s,2t+1) in the first layer and their sum, namely the pixel m(s,t) in the second layer.

More specifically, the pixel h(2s+1,2t+1) in the first layer is determined from the following equation.

$$h(2s+1,2t+1)=m(s,t)-(h(2s,2t)+h(2s+1,2t)+h(2s,2t+1))$$

Since the pixel h(2s+1,2t+1) in the first layer is thus determined from the above equation, the storing of the pixel is not needed.

The first layer memory 2 is arranged without the need for the memory cell for storing the pixel h(2s+1,2t+1), which is one of the 2×2 pixels h(2s,2t), h(2s+1,2t), h(2s,2t+1), and h(2s+1,2t+1) in the first layer.

In the above discussion, the first layer memory 2 has at least memory cells capable of storing image data of 512×512 pixels, but if the pixel h(2s+1,2t+1) in the first layer is not stored, the memory cells capable of storing the image data of 512×512×¾ pixels work. In such a case, the first layer memory 2 has memory cells (memory capacity) corresponding to the number which is obtained by subtracting the number of addresses in the second layer memory 3 (the number of pixels (256×256) for one screen of the second layer) from the number of pixels for one display screen of the first layer image.

One of the neighboring 2×2 pixels m(2m,2n), m(2m+1,2n), m(2m,2n+1), and m(2m+1,2n+1) in the second layer, for example, the right bottom pixel m(2m+1,2n+1) is determined from the remaining pixels m(2m,2n), m(2m+1,2n), m(2m,2n+1) in the second layer and their sum, namely the pixel q(m,n) in the third layer.

More specifically, the pixel m(2m+1,2n+1) in the second layer is determined from the following equation.

$$m(2m+1,2n+1)=q(m,n)-(m(2m,2n)+m(2m+1,2n)+m(2m,2n+1))$$

Since the pixel m(2m+1,2n+1) in the second layer is thus determined from the above equation, the storing of the pixel is not needed.

The second layer memory 3 is thus arranged without the need for the memory cell for storing the pixel m(2m+1,2n+1), which is one of the 2×2 pixels m(2m,2n), m(2m+1,2n), m(2m,2n+1), and m(2m+1,2n+1) in the second layer.

In the above discussion, the second layer memory 3 has at least memory cells capable of storing image data of 256×256 pixels, but if the pixel m(2m+1,2n+1) in the first layer is not stored, the memory cells capable of storing the image data of 256×256×¾ pixels work. In such a case, the second layer memory 3 has memory cells corresponding to the number which is obtained by subtracting the number of addresses in the third layer memory 4 (the number of pixels (128×128) for one screen of the third layer) from the number of pixels for one display screen of the second layer image.

Even when the first layer memory 2 and second layer memory 3 have a smaller memory capacity as described above, the image data writing to the first layer memory 2, second layer memory 3 and third layer memory 4 is performed as described with reference to FIGS. 3 through 5. In this case, however, the first layer memory 2 is without the memory cell for storing the pixel h(2s+1,2t+1) in the first layer, namely, without the memory cell corresponding to the address (2s+1,2t+1). Even if the address providing circuit 1 feeds the address (2s+1,2t+1) to the first layer memory 2 while the RMW circuit 5 feeds the pixel h(2s+1,2t+1) in the first layer, the pixel h(2s+1,2t+1) is not stored in the first layer memory 2.

Similarly, the second layer memory 3 is without the memory cell for storing the pixel m(2m+1,2n+1) in the second layer, namely, without the memory cell corresponding to the address (2m+1,2n+1). Even if the address providing circuit 1 feeds the address (2m+1,2n+1) to the second layer memory 3 while the RMW circuit 5 (write section 14 (FIG. 4)) feeds the pixel m(2m+1,2n+1) in the second layer, the pixel m(2m+1,2n+1) is not stored in the second layer memory 3.

Although the reading of the image stored in the third layer in the storage device is performed in the same way as described with reference to FIG. 5, the reading of the image of the first layer and the second layer is performed as follows.

Figure 6:
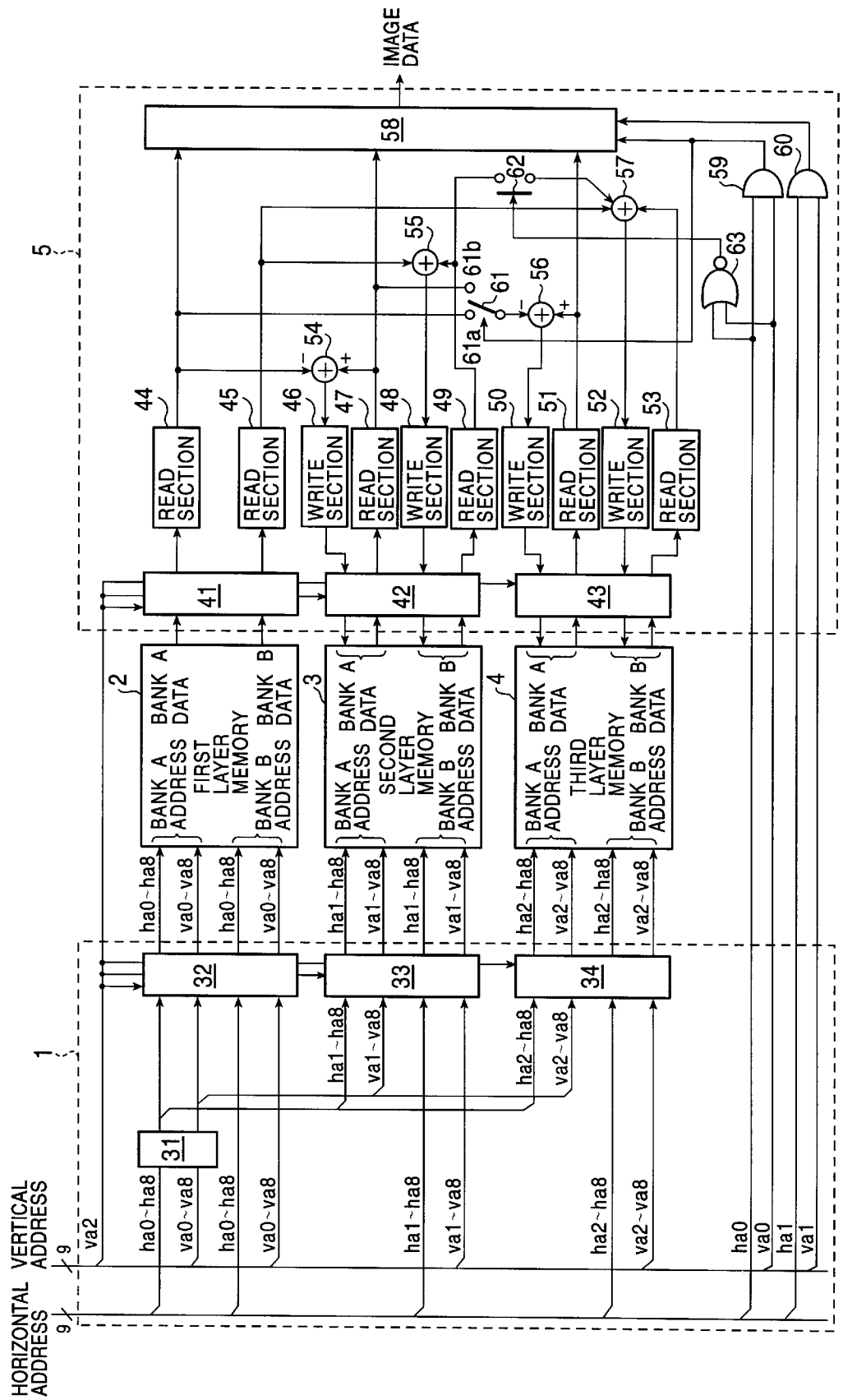
FIG. 6 is a fourth functional block diagram of the storage device of FIG. 1.

FIG. 6 shows the storage device in FIG. 1 having the first layer memory 2 with its reduced memory capacity when the reading operation of the first layer image is performed.

In this case, the address providing circuit 1 is constructed of a delay circuit 31 and selector circuits 32 through 34. The horizontal address HA and the vertical address VA are fed to the delay circuit 31, which latches and outputs, for example, the higher order seven bits va2 through va8 of the vertical address VA at a transition in the lower order third bit va2.

Specifically, the delay circuit 31 detects transitions from 0 to 1 and 1 to 0 in the lower order third bit va2 of the vertical address VA, and latches the higher order bits va2 through va8 of the vertical address VA immediately prior to the transition, and then outputs them together with the remaining vertical address and the horizontal address. The horizontal address HA and the vertical address VA output by the delay circuit 31 are the horizontal address HA and the vertical address VA supplied to the address providing circuit but with a delay of four lines ($=2^{3-1}$) introduced therewithin. Since the delay circuit 31 simply latches the higher order seven bits va2 through va8 of the vertical address VA immediately prior to the transition when the lower order third bit va2 of the vertical address VA transitions, the delay circuit 31 is not so large as the conventional one for line delaying an image. The delay circuit 31 may be constructed of seven flip-flops for latching the higher order seven bits va2 through va8 of the vertical address VA, implementing a compact design in the device.

The four-line earlier horizontal address HA and vertical address VA generated by the delay circuit 31 are hereinafter respectively referred to as delayed horizontal address HA and delayed vertical address VA (predetermined address signal) as necessary.

The delayed horizontal address HA and the delayed vertical address VA are fed to the selector circuit 32. Out of the delayed horizontal address HA and the delayed vertical address VA, the higher order eight bits ha1 through ha8, except the least significant bit ha0, of the delayed horizontal address Ha, and the higher order eight bits va1 through va8, except the least significant bit va0, of the vertical address VA are fed to the selector circuit 33. Furthermore, out of the delayed horizontal address HA and the delayed vertical address VA, the higher order seven bits ha2 through ha8, except the lower order two bits ha0 and ha1, of the delayed horizontal address Ha, and the higher order seven bits va2 through va8, except the lower order two bits va0 and va1, of the vertical address VA are fed to the selector circuit 34.

The selector circuit 32 receives the horizontal address HA and the vertical address VA, supplied to the address providing circuit 1, the delayed horizontal address HA, the delayed vertical address VA, and the lower order third bit va2 of the vertical address VA as a control signal. In response to the control signal va2, the selector circuit 32 selects the delayed horizontal address HA and the delayed vertical address VA as one of bank A address and bank B address and the horizontal address HA and the vertical address VA as the other of the bank A address and bank B address, to be fed to bank A address terminals and bank B address terminals of the first layer memory 2, respectively.

Suppose that the selector circuit 32 selects, for example, the delayed horizontal address HA and the delayed vertical address VA as the bank A address and the horizontal address HA and the vertical address VA as the bank B address, and the selector circuit 32 then reelects the delayed horizontal address HA and the delayed vertical address VA as the bank B address and the horizontal address HA and the vertical address VA as the bank A address at the moment the control signal va2 transitions. When the control signal va2 transitions again thereafter, the selector circuit 32 selects the delayed horizontal address HA and the delayed vertical address VA as the bank A address and the horizontal address HA and the vertical address VA as the bank B address. Each time the control signal va2 transitions, the delayed horizontal address HA and the delayed vertical address VA alternate between the bank A address and the bank B address while the horizontal address HA and the vertical address VA alternate between the bank B address and the bank A address.

The selector circuit 33 receives, besides the higher order eight bits ha1 through ha8 of the delayed horizontal address HA and the higher order eight bits va1 through va8 of the delayed vertical address VA, the higher order eight bits ha1 through ha8 of the horizontal address HA and the higher order eight bits va1 through va8 of the vertical address VA, supplied to the address providing circuit 1, and the lower order third bit va2 of the vertical address VA as a control signal. As in the selector circuit 32, in the selector circuit 33, each time the control signal va2 transitions, the higher order eight bits ha1 through ha8 of the delayed horizontal address HA and the higher order eight bits va1 through va8 of the delayed vertical address VA alternate between the bank A address and the bank B address while the higher order eight bits ha1 through ha8 of the horizontal address HA and the higher order eight bits va1 through va8 of the vertical address VA alternate between the bank B address and the bank A address.

Bits selected as the bank A address and bank B address by the selector circuit 33 are respectively fed to the bank A address terminals and the bank B address terminals in the second layer memory 3.

The selector circuit 34 receives, besides the higher order seven bits ha2 through ha8 of the delayed horizontal address HA and the higher order seven bits va2 through va8 of the delayed vertical address VA, the higher order seven bits ha2 through ha8 of the horizontal address HA and the higher order seven bits va2 through va8 of the vertical address VA, supplied to the address providing circuit 1, and the lower order third bit va2 of the vertical address VA as a control signal. As in the selector circuit 33, in the selector circuit 34, each time the control signal va2 transitions, the higher order seven bits ha2 through ha8 of the delayed horizontal address HA and the higher order seven bits va2 through va8 of the delayed vertical address VA alternate between the bank A address and the bank B address while the higher order seven bits ha2 through ha8 of the horizontal address HA and the higher order seven bits va2 through va8 of the vertical address VA alternate between the bank B address and the bank A address.

Bits selected as the bank A address and bank B address by the selector circuit 34 are respectively fed to the bank A address terminals and the bank B address terminals in the third layer memory 4.

The address space of the first layer memory 2 is divided into two banks (blocks) of a bank A and a bank B in the embodiment shown in FIG. 6 (the same is true in FIG. 8 as will be described later). Specifically, as shown in FIG. 2, the memory area of the first layer memory 2 for storing the pixels on an $8\alpha$ line through an $8\alpha+3$ line is the bank A and the memory area of the first layer memory 2 for storing the pixels on an $8\alpha+4$ line through an $8\alpha+7$ line is the bank B ($\alpha=0, 1, \ldots, 63$).

To permit concurrent accesses to both the bank A and the bank B, two address terminals, namely, an address terminal (bank A address terminal) for accessing the bank A and an address terminal (bank B address terminal) are available. The bank A and the bank B have respectively two bank A data terminals and two bank B data terminals, as input/output terminals for reading data therefrom and writing data thereto.

In the first layer memory 2, data (bank A data) is read and written via the bank A terminals at the address (the bank A address) input to the bank A address terminals while data (bank B data) is read and written via the bank B terminals at the address (the bank B address) input to the bank B address terminals.

In this embodiment, the delayed horizontal address HA and the delayed vertical address VA are respectively the horizontal address HA and the vertical address VA but a delay of four lines introduced therein (four lines in the first layer image). When the selector circuit 32 selects, for example, the horizontal address HA and the vertical address VA as the bank A address and the delayed horizontal address HA and the delayed vertical address VA as the bank B address, the memory cells of the bank A address corresponding to the horizontal address HA and the vertical address VA are accessed while the memory cells of the bank B address corresponding to the delayed horizontal address HA and the delayed vertical address VA, which were accessed four lines earlier, are also accessed.

Figure 7:
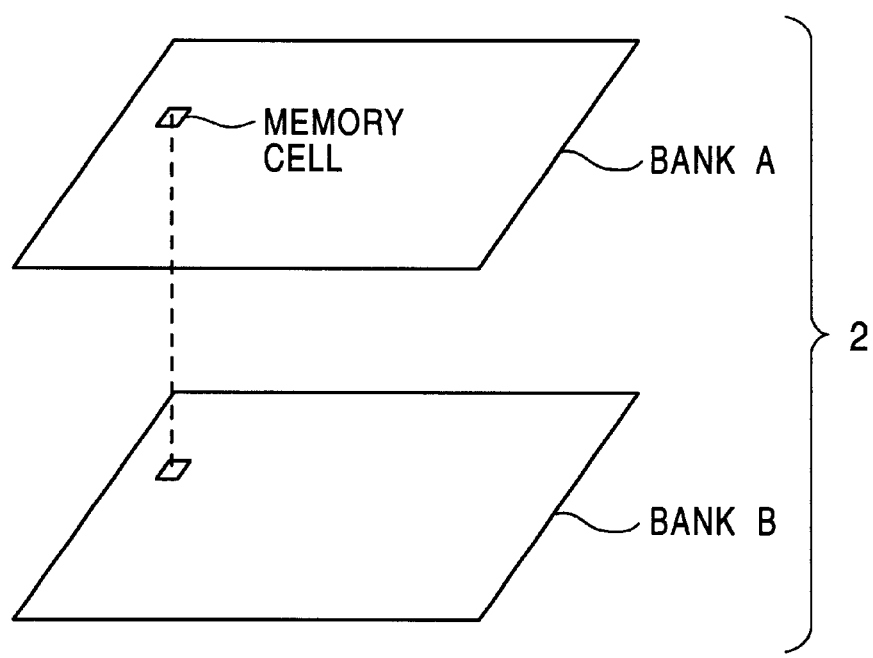
FIG. 7 illustrates a first layer memory 2 of FIG. 6 which is divided into a bank A and a bank B.

Suppose now that the first layer memory 2 is now divided into a memory area as a bank A and a memory area as a bank B as shown in FIG. 7, and a memory cell in the bank A is accessed while a memory cell in the bank B is accessed at the same time. The corresponding memory cells in the concurrently accessed bank A and bank B are spaced by four lines in this embodiment. The reason why the corresponding memory cells in the concurrently accessed bank A and bank B are spaced by four lines is as follows: since a single pixel in the third layer as the top hierarchical layer corresponds to 4×4 pixels in the first layer in this embodiment, each bank is preferably based on at least the unit of 4×4 pixels. The bank A and the bank B alternate every four lines here. Alternatively, the bank A and the bank B may alternate every four columns. The number of banks are not limited to the two banks, bank A and bank B. Furthermore, banks are formed in both a horizontal direction and a vertical direction, namely, in a grid pattern.

Returning to FIG. 6, as in the first layer memory 2, the address space in the second layer memory 3 is divided into two banks, bank A and bank B. Since the numbers of pixels in a horizontal direction and in a vertical direction for the second layer image are respectively half the numbers of pixels in a horizontal direction and in a vertical direction in the first layer image, the memory area of the second layer memory 3 for storing the pixels on a $4\alpha$ line and $4\alpha+1$ line in the second layer is the bank A and the memory area of the second layer memory 3 for storing the pixels on a $4\alpha+2$ line and $4\alpha+3$ line is the bank B.

As in the first layer memory 2, the address space in the third layer memory 4 is divided into two banks, bank A and bank B. Since the numbers of pixels in a horizontal direction and in a vertical direction for the third layer image are respectively ¼ the numbers of pixels in a horizontal direction and in a vertical direction in the first layer image, the memory area of the third layer memory 4 for storing the pixels on a 2α line in the third layer is the bank A and the memory area of the third layer memory 4 for storing the pixels on a 2α+1 line is the bank B.

Connected to a selector circuit 41 are a bank A data terminal and a bank B data terminal, to which data (bank A data and bank B data) read from the bank A and bank B in the first layer memory 2 are respectively output. The address providing circuit 1 feeds the lower order third bit va2 of the vertical address VA to the selector circuit 41 as the control signal, and in response to the control signal va2, the selector circuit 41 connects one of the bank A data terminal and the bank B data terminal to a read section 44 and the other of the bank A data terminal and the bank B data terminal to a read section 45.

When the control signal va2 transitions at one point with the selector circuit 41 connecting the bank A data terminal and bank B data terminal respectively to the read section 44 and read section 45, the bank A data terminal and bank B data terminal are reconnected to the read section 45 and the read section 44, respectively. When the control signal va2 transitions again, the selector circuit 41 connects again the bank A data terminal and bank B data terminal to the read section 44 and read section 45, respectively. Each time the control signal va2 transitions, the selector circuit 41 alternates the connection of the bank A data terminal to between the read section 44 and read section 45 while alternating the connection of the bank B data terminal to between the read section 45 and read section 44.

Connected to a selector circuit 42 are a bank A data terminal to which the data to be written onto the bank A in the second layer memory 3 is fed, a bank A data terminal from which the data read from the bank A is output, a bank B data terminal to which the data to be written onto the bank B is fed, and a bank B data terminal from which the data read from the bank B is output. The selector circuit 42 is also provided with the lower order third bit va2 of the vertical address VA from the address providing circuit 1 as a control signal, and in response to the control signal va2, the selector circuit 42 connects ones of the bank A data terminals and the bank B data terminals to a write section 46 and a read section 47 while connecting the other of the bank A data terminals and the bank B data terminals to a write section 48 and a read section 49.

When the control signal va2 transitions at one point with the selector circuit 42 connecting the bank A data terminals to the write section 46 and read section 47 and the bank B data terminals to the write section 48 and read section 49, the bank A data terminals are reconnected to the write section 48 and read section 49 while the bank B data terminals are reconnected to the write section 46 and read section 47. When the control signal va2 transitions again, the selector circuit 42 connects again the bank A data terminals to the write section 46 and read section 47 while connecting the bank B data terminals to the write section 48 and read section 49. Each time the control signal va2 transitions, the selector circuit 42 alternates the connection of the bank A data terminals to between the write section 46 and read section 47, and the write section 48 and read section 49 while alternating the connection of the bank B data terminals to between the write section 48 and read section 49 and the write section 46 and read section 47.

Connected to a selector circuit 43 are a bank A data terminal to which the data to be written onto the bank A in the third layer memory 4 is fed, a bank A data terminal from which the data read from the bank A is output, a bank B data terminal to which the data to be written onto the bank B is fed, and a bank B data terminal from which the data read from the bank B is output. The selector circuit 43 is also provided with the lower order third bit va2 of the vertical address VA from the address providing circuit 1 as a control signal. In the same way as in the selector circuit 42, in response to the control signal va2, the selector circuit 43 alternates the connection of the bank A data terminals to between a write section 50 and a read section 51, and a write section 52 and a read section 53 while alternating the connection of the bank B data terminals to between the write section 52 and read section 53, and the write section 50 and read section 51.

The read section 44 and read section 45 read data from the first layer memory 2 via the selector circuit 41. The data read by the read section 44 is fed to an arithmetic unit 54 and a selector circuit 58 and is also fed to an arithmetic unit 56 via a switch 61. The data read by the read section 45 is fed to arithmetic units 55 and 57. The write section 46 writes the output of the arithmetic unit 54 onto the second layer memory 3 via the selector circuit 42. The read section 47 reads data from the second layer memory 3 via the selector circuit 42, and feeds the data to the arithmetic unit 54 and the selector circuit 58. The write section 48 writes the output of the arithmetic unit 55 onto the second layer memory 3 via the selector circuit 42. The read section 49 reads data from the second layer memory 3 via the selector circuit 42, and feeds the data to the arithmetic unit 55 and a switch 62. The write section 50 writes the output of the arithmetic unit 56 onto the third layer memory 4 via the selector circuit 43. The read section 51 reads data from the third layer memory 4 via the selector circuit 43, and feeds the data to the arithmetic unit 56 and the selector circuit 58. The write section 52 writes the output of the arithmetic unit 57 onto the third layer memory 4 via the selector circuit 43. The read section 53 reads data from the third layer memory 4 via the selector circuit 43 and feeds the data to the arithmetic unit 57.

The arithmetic unit 54 subtracts the output of the read section 44 from the output of the read section 47, and feeds the difference to the write section 46. The arithmetic unit 55 sums the outputs of the read section 45 and read section 49, and feeds the sum to the write section 48. The arithmetic unit 56 subtracts the signal supplied by the switch 61 from the output of the read section 51, and feeds the difference to the write section 50. The arithmetic unit 57 sums the outputs of the read section 45 and read section 53, and feeds the sum to the write section 52. The arithmetic unit 57 also sums the output of the read section 49 in its summing operation when the switch 62 is turned on and when the read section 49 gives its output.

The selector circuit 58 selects one of the outputs of the read section 44, read section 47 and read section 51 in response to the outputs of AND gates 59 and 60. The AND gate 59 receives the least significant bit ha0 of the horizontal address HA and the least significant bit va0 of the vertical address VA as control signals from the address providing circuit 1, computes their logical product and feeds it to the selector circuit 58. The AND gate 60 receives the lower order second bit ha1 of the horizontal address HA and the lower order second bit va1 of the vertical address VA supplied to the address providing circuit 1 as control signals, computes their logical product and feeds it to the selector circuit 58.

Depending on the output of the AND gate 59, the switch 61 selects between its terminal 61*a* and terminal 61*b*. The terminals 61a and 61b are supplied with the output of the read section 44 and the output of the read section 47, respectively. Depending on the output of a NOR gate 63, the switch 62 is turned on and off to conduct the output of the read section 49 to the arithmetic unit 57. Like the AND gate 59, the NOR gate 63 receives the least significant bits ha0 and va0, and its output on/off controls the switch 62.

The RMW circuit 5 is thus constructed of the selector circuits 41 through 43, read sections 44 and 45, write section 46, read section 47, write section 48, read section 49, write section 50, read section 51, write section 52, read section 53, arithmetic units 54 through 57, selector circuit 58, AND gates 59 and 60, switches 61 and 62, and NOR gate 63.

The clock, the R/W signal and the hierarchical flag are omitted in FIG. 6 (the same is true in FIG. 8 to be described later).

The operation of the RMW circuit 5 is now discussed.

Suppose now that the selector circuit 32 selects the horizontal address HA and the vertical address VA, supplied to the address providing circuit 1, as the bank A address and the delayed horizontal address HA and the delayed vertical address VA as the bank B address.

Similarly, the selector circuits 33 and 34 select the bank A address and bank B address. Specifically, the selector circuit 33 selects the higher order eight bits ha1 through ha8 of the horizontal address HA and the higher order eight bits va1 through va8 of the vertical address VA as the bank A address, and the higher order eight bits ha1 through ha8 of the delayed horizontal address HA and the higher order eight bits va1 through va8 of the delayed vertical address VA as the bank B address. The selector circuit 34 selects the higher order seven bits ha2 through ha8 of the horizontal address HA and the higher order seven bits va2 through va8 of the vertical address VA as the bank A address, and the higher order seven bits ha2 through ha8 of the delayed horizontal address HA and the higher order seven bits va2 through va8 of the delayed vertical address VA as the bank B address.

The bank A address and bank B address selected in the selector circuits 32 through 34 are respectively fed to the bank A address terminals and bank B address terminals of the first layer memory 2, second layer memory 3 and third layer memory 4.

In the selector circuit 41, the bank A data terminal of the first layer memory 2 is connected to the read section 44 while the bank B data terminal is connected to the read section 45. In the selector circuit 42, the bank A data terminals of the second layer memory 3 are connected to the write section 46 and read section 47 while the bank B data terminals are connected to the write section 48 and read section 49. In the selector circuit 43, the bank A data terminals of the third layer memory 4 are connected to the write section 50 and read section 51 while the bank B data terminals are connected to the write section 52 and read section 53.

The read section 44 reads, via the selector circuit 41, a pixel (pixel value) in the first layer stored in a bank A address output by the selector circuit 32, and feeds it to the arithmetic unit 54, the selector circuit 58, and the terminal 61a of the switch 61.

The selector circuit 58 selects and outputs the output of the read section 44 as a pixel in the first layer when the output of the AND gate 59 is not a 1 (namely, a 0). Specifically, that the output of the AND gate 59 is not a 1 means that at least one of ha0 and va0 is a 0, and means the timing any of the three pixels h(2s,2t), h(2s+1,2t) and h(2s,2t+1) except the bottom right pixel h(2s+1,2t+1), out of four pixels 2×2 of h(2s,2t), h(2s+1,2t), h(2s,2t+1), and h(2s+1,2t+1) in the first layer represented by D1 as shown in FIG. 2 is read. Since any of h(2s,2t), h(2s+1,2t) and h(2s,2t+1) is stored in the first layer memory 2, the value read from the first layer memory 2, as is, is selected and output by the selector circuit 58.

The read section 47 reads, via the selector circuit 42, a second layer pixel (pixel value) in the second layer stored at a bank A address output by the selector circuit 33, and feeds it to the arithmetic unit 54, the selector circuit 58 and the terminal 61b of the switch 61.

At the timing any of the four pixels 2×2 of h(2s,2t), h(2s+1,2t), h(2s,2t+1), and h(2s+1,2t+1) in the first layer is accessed, namely, at the timing any of the bank A address (2s,2t), (2s+1,2t), (2s,2t+1), and (2s+1,2t+1) in the first layer memory 2 is accessed, the bank A address (s,t) in the second layer memory 3 is accessed.

When the read section 44 reads one of the pixels h(2s,2t), h(2s+1,2t), and h(2s,2t+1) from the first layer memory 2 and feeds it to the arithmetic unit 54, the read section 47 reads the data from the bank A address (s,t) in the second layer memory 3, and feeds it to the arithmetic unit 54.

The arithmetic unit 54 subtracts the output of the read section 44 from the output of the read section 47, and feeds the difference to the write section 46. The write section 46 writes the output of the arithmetic unit 54 onto the bank A address (s,t) in the second layer memory 3 via the selector circuit 42.

The second layer pixel m(s,t), which is the sum of the four pixels of 2×2 of h(2s,2t), h(2s+1,2t), h(2s,2t+1), and h(2s+1,2t+1) in the first layer, is initially stored in the bank A address (s,t) in the second layer memory 3. As the read section 44 reads the pixel h(2s,2t) in the first layer while the read section 47 reads the data (here, m(s,t)) stored at the bank A address (s,t) in the second layer memory 3, the arithmetic unit 54 determines the difference (m(s,t)–h(2s, 2t)) therebetween and the write section 46 writes it onto the bank A address (s,t) in the second layer memory 3.

As the read section 44 reads the pixel h(2s+1,2t) in the first layer, the read section 47 reads the data (here, m(s,t)–h(2s,2t)) stored at the bank A address (s,t) in the second layer memory 3. The arithmetic unit 54 determines the difference (m(s,t)–h(2s,2t)–h(2s+1,2t)) therebetween and the write section 46 writes it onto the bank A address (s,t) in the second layer memory 3.

As the read section 44 reads the pixel h(2s,2t+1) in the first layer, the read section 47 reads the data (here, m(s,t)–h(2s,2t)–h(2s+1,2t)) stored at the bank A address (s,t) in the second layer memory 3. The arithmetic unit 54 determines the difference (m(s,t)–h(2s,2t)–h(2s+1,2t)–h(2s,2t+1)) therebetween and the write section 46 writes it onto the bank A address (s,t) in the second layer memory 3. Finally, the first layer pixel h(2s+1,2t+1)(=m(s,t)–h(2s,2t)–h(2s+1,2t)–h(2s,2t+1)) is written onto the bank A address (s,t) in the second layer memory 3.

The data which the read section 47 reads from the bank A address (s,t) in the second layer memory 3, at the timing the bank A address (2s+1,2t+1) in the first layer memory 2 is accessed (there is no memory cell corresponding to this address, and even if an attempt is made to access this address, nothing is written thereon and nothing is read therefrom), is the bottom right pixel (pixel value) h(2s+1, 2t+1), out of four pixels 2×2 of h(2s,2t), h(2s+1,2t), h(2s, 2t+1), and h(2s+1,2t+1) in the first layer represented by D1 as shown in FIG. 2 (excluding h(4m+3,4n+3)).

The selector circuit 58 selects and outputs the output of the read section 44 as a pixel in the first layer when the output of the AND gate 59 only (of the two outputs of the AND gate 59 and AND gate 60) is a 1 (the output of the AND gate 60 is thus a 0). Specifically, that the output of the AND gate 59 only is a 1 means that both ha0 and va0 are 1's and that ha1 and/or va1 are a 0, and means the timing the bottom right pixel h(2s+1,2t+1), out of the four pixels 2×2 of h(2s,2t), h(2s+1,2t), h(2s,2t+1), and h(2s+1,2t+1) in the first layer represented by D1 as shown in FIG. 2 (excluding h(4m+3,4n+3)) is read. As described above, the pixel h(2s+1,2n+1) is read from the bank A address (s,t) in the second layer memory 3 by the read section 47, and the output of the read section 47 is selected and output by the selector circuit 58.

The read section 51 reads, via the selector circuit 43 from the third layer memory 4, a pixel (pixel value) in the third layer stored at the bank A address, output by the selector circuit 34, and feeds it to the arithmetic unit 56 and selector circuit 58.

At the timing each of 16 pixels of 4×4 of h(4m,4n),
h(4m+1,4n), h(4m+2,4n), h(4m+3,4n), h(4m,4n+1),
h(4m+1,4n+1), h(4m+2,4n+1), h(4m+3,4n+1), h(4m,4n+2),
h(4m+1,4n+2), h(4m+2,4n+2), h(4m+3,4n+2), h(4m,4n+3),
h(4m+1,4n+3), h(4m+2,4n+3), and h(4m+3,4n+3)
in the first layer represented by D2 as shown in FIG. 2 is accessed, as described above, the bank A address (m,n) in the third layer memory 4 is accessed.

When the read section 44 reads each of the pixels
h(4m,4n), h(4m+1,4n), h(4m+2,4n), h(4m+3,4n), h(4m,4n+1),
h(4m+2,4n+1), h(4m,4n+2), h(4m+1,4n+2), h(4m+2,4n+2),
h(4m+3,4n+2), h(4m,4n+3), and h(4m+2,4n+3)
in the first layer memory 2, excluding the bottom right pixel h(2s+1,2t+1) in the first layer 2×2 pixels, and feeds it to the terminal 61a, the read section 51 reads data from the bank A address (m,n) in the third layer memory 4 and feeds it to the arithmetic unit 56.

The switch 61 selects its terminal 61a when the output of the AND gate 59 is a 0. Each of the pixels
h(4m,4n), h(4m+1,4n), h(4m+2,4n), h(4m+3,4n), h(4m,4n+1),
h(4m+2,4n+1), h(4m,4n+2), h(4m+1,4n+2), h(4m+2,4n+2),
h(4m+3,4n+2), h(4m,4n+3), and h(4m+2,4n+3)
in the first layer output by the read section 44 is fed to the arithmetic unit 56 via the switch 61.

When the read section 47 outputs pixels h(4m+1,4n+1), corresponding to the right bottom pixel h(2s+1,2t+1) in the 2×2 pixels in the first layer, h(4m+3,4n+1), and h(4m+1,4n+3), when the output of the AND gate 59 is a 1, the switch 61 is designed to select its terminal 61b. The pixels h(4m+1,4n+1), h(4m+3,4n+1), and h(4m+1,4n+3) output by the read section 47 are fed to the arithmetic unit 56 via the switch 61.

The arithmetic unit 56 subtracts the output of the switch 61 from the output of the read section 51, and feeds the difference to the write section 50. The write section 50 writes the output of the arithmetic unit 56 onto the bank A address (m,n) in the third layer memory 4 via the selector circuit 43.

The third layer pixel q(m,n), which is the sum of the 16 pixels of 4×4 in the first layer, is initially stored at the bank A address (m,n) in the third layer memory 4. As the read section 44 reads the pixel h(4m,4n) in the first layer, the read section 51 reads the data (here, q(m,n)) stored at the bank A address (m,n) in the third layer memory 4. The arithmetic unit 56 determines the difference (q(m,n)−h(4m,4n)) therebetween and the write section 50 writes it onto the bank A address (m,n) in the third layer memory 4.

As the read section 44 reads the pixel h(4m+1,4n) in the first layer, the read section 51 reads the data (here, q(m,n)−h(4m,4n)) stored at the bank A address (m,n) in the third layer memory 4. The arithmetic unit 56 determines the difference (q(m,n)−h(4m,4n)−h(4m+1,4n)) therebetween and the write section 50 writes it onto the bank A address (m,n) in the third layer memory 4.

Similarly, the value stored at the bank A address (m,n) in the third layer memory 4 is thereafter repeatedly rewritten.

Reading the first layer pixel h(4m+1,4n+1), corresponding to the bottom right pixel h(2s+1,2t+1) in the 2×2 pixels in the first layer, the read section 47 feeds it to the arithmetic unit 56 via the switch 61 as already described. The bank A address in the third layer memory 4 then stores the data expressed by equation $$q(m,n)-h(4m,4n)-h(4m+1,4n)-h(4m+2,4n)-h(4m+3,4n)-h(4m,4n+1),$$

and the read section 51 reads the data and feeds it to the arithmetic unit 56.

The arithmetic unit 56 subtracts the output of the read section 47 from the output of the read section 51, and the write section 50 writes the difference $$(q(m,n)-h(4m,4n)-h(4m+1,4n)-h(4m+2,4n)-h(4m+3,4n)-h(4m,4n+1)-h(4m+1,4n+1))$$

onto the bank A address (m,n) in the third layer memory 4.

Finally, as the read section 44 reads the pixel h(4m+2,4n+3) in the first layer, the read section 51 reads the data stored at the bank A address in the third layer memory 4 (here, q(m,n)−h(4m,4n)−h(4m+1,4n)−h(4m+2,4n)−h(4m+3,4n)−h(4m,4n+1)−h(4m+1,4n+1)−h(4m+2,4n+1)−h(4m+3,4n+1)−h(4m,4n+2)−h(4m+1,4n+2)−h(4m+2,4n+2)−h(4m+3,4n+2)−h(4m,4n+3)−h(4m+1,4n+3)). The arithmetic unit 56 determines the difference therebetween, and the write section 50 writes the difference onto the bank A address (m,n) in the third layer memory 4. Specifically, the pixel (4m+3,4n+3) in the first layer (=q(m,n)−h(4m,4n)−h(4m+1,4n)−h(4m+2,4n)−h(4m+3,4n)−h(4m,4n+1)−h(4m+1,4n+1)−h(4m+2,4n+1)−h(4m+3,4n+1)−h(4m,4n+2)−h(4m+1,4n+2)−h(4m+2,4n+2)−h(4m+3,4n+2)−h(4m,4n+3)−h(4m+1,4n+3)−h(4m+2,4n+3)) is written onto the bank A address (m,n) in the third layer memory 4.

The data which the read section 51 reads from the bank A address (m,n) in the third layer memory 4, at the timing the bank A address (4m+3,4n+3) in the first layer memory 2 is accessed (there is no memory cell corresponding to this address, and even if an attempt is made to access this address, nothing is written thereon and nothing is read therefrom), is the bottom right pixel (pixel value) h(4m+3,4n+3), out of the 16 pixels of 4×4 in the first layer represented by D2 as shown in FIG. 2.

The selector circuit 58 selects and outputs the output of the read section 51 as a first layer pixel when the outputs of both AND gate 59 and AND gate 60 are 1's. Specifically, that the outputs of both AND gate 59 and AND gate 60 are 1's means that all of ha0, va0, ha1, and va1 are 1's, and means the timing the bottom right pixel (4m+3,4n+3) of the 16 pixels of 4×4 in the first layer is read. The read section 51 reads the pixel h(4m+3,4n+3) from the bank A address (m,n) in the third layer memory 4, and the output of the read section 51 is selected and output by the selector circuit 58.

When the pixels of the first layer are read in this way, the second layer memory 3 stores the first layer pixel h(2s+1, $2n+1$) (excluding h(4m+3,4n+3)), and the third layer memory 4 stores the first layer pixel h(4m+3,4n+3).

The pixels in the first layer are written, replacing the stored values in the second layer memory 3 and third layer memory 4.

The values, thus rewritten, in the second layer memory 3 and third layer memory 4 need to be restored to their original pixels in the second layer memory 3 and third layer memory 4 (if unnecessary, they may be left unrestored).

As already described, the first layer memory 2 is divided into the bank A for storing the pixels on the $8\alpha$ line through the $8\alpha+3$ line and the bank B for storing the pixels on the $8\alpha+4$ line through the $8\alpha+7$ line. The second layer memory 3 is divided into the bank A for storing the pixels on the $4\alpha$ line and the $4\alpha+1$ line in the second layer and the bank B for storing the pixels on the $4\alpha+2$ line and the $4\alpha+3$ line in the second layer, and the third layer memory 4 is divided into the bank A for storing the pixels on the $2\alpha$ line in the third layer and the bank B for storing the pixels on the $2\alpha+1$ line.

In this embodiment, the delayed horizontal address HA and the delayed vertical address VA are respectively the horizontal address HA and the vertical address VA but with a delay of four lines introduced therein. As already described above, when the horizontal address HA and the vertical address VA are selected as the bank A address while the delayed horizontal address HA and the delayed vertical address VA being selected as the bank B address, a memory cell in the bank A for the horizontal address HA and the vertical address VA is accessed in the first layer memory 2, and at the same time, a memory cell in the bank B (the B bank memory cell corresponding to the position of the memory cell in the bank A) for the delayed horizontal address HA and the delayed vertical address VA is also accessed.

Similarly, in the second layer memory 3, a memory cell in the bank A is accessed while a memory cell in the bank B, which was accessed by two lines earlier, is accessed. In the third layer memory 4, a memory cell in the bank A is accessed while a memory cell in the bank B, which was accessed by one line earlier, is accessed.

As the read section 44 reads each of the pixels h(2s,2t), h(2s+1,2t), and h(2s,2t+1) from the bank A in the first layer memory 2, the read section 45 reads, via the selector circuit 41, each of pixels h(2s,2t'), h(2s+1,2t'), and h(2s,2t'+1) from the bank B in the first layer memory, which were accessed four lines earlier, and feeds it to the arithmetic unit 55. Here, t'=t−2.

As the read section 45 reads each of the pixels h(2s,2t'), h(2s+1,2t'), and h(2s,2t'+1) from the bank B in the first layer memory 2, the read section 49 reads, via the selector circuit 42, the data from the address (predetermined address) (s,t') in the bank B in the second layer memory 3 and feeds the data to the arithmetic unit 55.

The arithmetic unit 55 sums the output of the read section 45 and the output of the read section 49 and feeds the sum to the write section 48. The write section 48 writes the output of the arithmetic unit 55 onto the bank B address (s,t') in the second layer memory 3 via the selector circuit 42.

The bank B address (s,t') in the second layer memory 3 initially stores the first layer pixel h(2s+1,2t'+1) that was determined by accessing it two lines earlier in the second layer (four lines earlier in the first layer). As the read section 45 reads the first layer pixel h(2s,2t') from the bank B in the first layer memory 2, the read section 49 reads the data (here, h(2s+1,2t'+1)) stored at the bank B address (s,t') in the second layer memory 3. The arithmetic unit 55 determines the sum of these (h(2s,2t')+h(2s+1,2t'+1)), and the write section 48 writes it onto the bank B address (s,t') in the second layer memory 3.

Furthermore, as the read section 45 reads the first layer pixel h(2s+1,2t') from the bank B in the first layer memory 2, the read section 49 reads the data (here, h(2s,2t')+h(2s+1,2t'+1)) stored at the bank B address (s,t') in the second layer memory 3. The arithmetic unit 55 determines the sum of these (h(2s,2t')+h(2s+1,2t')+h(2s+1,2t'+1)) and the write section 48 writes it onto the bank B address (s,t') in the second layer memory 3.

As the read section 45 reads the first layer pixel h(2s,2t'+1) from the bank B in the first layer memory 2, the read section 49 reads the data (here, h(2s,2t')+h(2s+1,2t')+h(2s+1,2t'+1)) stored at the bank B address (s,t') in the second layer memory 3. The arithmetic unit 55 determines the sum of these (h(2s,2t')+h(2s+1,2t')+h(2s,2t'+1)+h(2s+1,2t'+1)) and the write section 48 writes it onto the bank B address (s,t') in the second layer memory 3. Written onto the bank B address (s,t') in the second layer memory 3 is the original second layer pixel m(s,t')(=h(2s,2t')+h(2s+1,2t')+h(2s,2t'+1)+h(2s+1,2t'+1)).

When the read section 44 reads, from the bank A in the first layer memory 2, each of the first layer pixels h(4m,4n), h(4m+1,4n), h(4m+2,4n), h(4m+3,4n), h(4m,4n+1), h(4m+2,4n+1), h(4m,4n+2), h(4m+1,4n+2), h(4m+2,4n+2), h(4m+3,4n+2), h(4m,4n+3), and h(4m+2,4n+3)

in the first layer, except the bottom right pixel h(2s+1,2t+1) of the 2×2 pixels in the first layer, the read section 45 reads, via the selector circuit 41 from the bank B in the first layer memory 2, each of first layer pixels four lines earlier h(4m,4n'), h(4m+1,4n'), h(4m+2,4n'), h(4m+3,4n'), h(4m,4n'+1), h(4m+2,4n'+1), h(4m,4n'+2), h(4m+1,4n'+2), h(4m+2,4n'+2), h(4m+3,4n'+2), h(4m,4n'+3), and h(4m+2,4n'+3), and feeds it to the arithmetic unit 57. Here, n'=n−1.

The read section 53 reads the data from the bank B address (m,n') in the third layer memory 4 via the selector circuit 43, and feeds it to the arithmetic unit 57.

The output of the read section 49 is fed to the arithmetic unit 57 via the switch 62. The switch 62 is turned on only when the output of the NOR gate 63 is at an H level (ha0=va0=0), and is turned off in the remainder of the time. The switch 62 is therefore turned on only when the read section 49 reads each of the first layer pixels h(4m+1,4n'+1), h(4m+3,4n'+1), and h(4m+1,4n'+3) from the bank B in the second layer memory 3 and as a result, the first layer pixels h(4m+1,4n'+1), h(4m+3,4n'+1), and h(4m+1,4n'+3) are fed to the arithmetic unit 57 via the switch 62.

The arithmetic unit 57 sums the output of the read section 45 and the output of the read section 53, and further sums the output of the read section 49 in the summing operation when the switch 62 is turned and when the read section 49 gives its output, and the resulting sum is fed to the write section 52. The write section 52 writes the output of the arithmetic unit 57 onto the bank B address (m,n') in the third layer memory 4 via the selector circuit 43.

The bank A address (m,n') in the third layer memory 4 initially stores the first layer pixel h(4m+3,4n'+3) that was determined by accessing it one line earlier in the third layer (four lines earlier in the first layer). As the read section 45 and the read section 49 read the first layer pixel h(4m,4n') and h(4m+1,4n'+1), respectively, the read section 53 reads the data (here, h(4m+3,4n'+3)) stored at the bank B address (m,n') in the third layer memory 4. The arithmetic unit 57 determines the sum of these (h(4m,4n')+h(4m+1,4n'+1)+h(4m+3,4n'+3)), and the write section 52 writes it onto the bank B address (m,n') in the third layer memory 4.

As the read section 45 reads the first layer pixel h(4m+1,4n'), the read section 53 reads the data (here, h(4m,4n')+h(4m+1,4n'+1)+h(4m+3,4n'+3)) stored at the bank B address (m,n') in the third layer memory 4. The arithmetic unit 57 determines the sum of these (h(4m,4n')+h(4m+1,4n')++h(4m+1,4n'+1)+h(4m+3,4n'+3)), and the write section 52 writes it onto the bank B address (m,n') in the third layer memory 4.

Finally, the read section 45 reads the first pixel h(4m+2,4n'+3) and the read section 53 reads the data (here, h(4m,4n')+h(4m+1,4n')+h(4m+2,4n')+h(4m+3,4n')+h(4m,4n'+1)+h(4m+1,4n'+1)+h(4m+2,4n'+1)+h(4m+3,4n'+1)+h(4m,4n'+2)+h(4m+1,4n'+2)+h(4m+2,4n'+2)+h(4m+3,4n'+2)+h(4m,4n'+3)+h(4m+1,4n'+3)+h(4m+3,4n'+3)) stored at the bank B address (m,n') in the third layer memory 4. The arithmetic unit 57 determines the sum of these, and the write section 52 write it onto the bank B address (m,n') in the third layer memory 4. Specifically, written onto the bank B address (m,n') in the third layer memory 4 is the original third layer pixel q(m,n')(=h(4m,4n')+h(4m+1,4n')+h(4m+2,4n')+h(4m+3,4n')+h(4m,4n'+1)+h(4m+1,4n'+1)+h(4m+2,4n'+1)+h(4m+3,4n'+1)+h(4m,4n'+2)+h(4m+1,4n'+2)+h(4m+2,4n'+2)+h(4m+3,4n'+2)+h(4m,4n'+3)+h(4m+1,4n'+3)+h(4m+2,4n'+3)+h(4m+3,4n'+3)).

When the lower order third bit va2 of the vertical address VA transitions, the selector circuit 32 selects the horizontal address HA and the vertical address VA, supplied to the address providing circuit 1, as the bank B address and the delayed horizontal address HA and the delayed vertical address VA as the bank A address.

Similarly, the selector circuits 33 and 34 select the bank A address and bank B address. Specifically, the selector circuit 33 selects the higher order eight bits ha1 through ha8 of the horizontal address HA and the higher order eight bits va1 through va8 of the vertical address VA as the bank B address, and the higher order eight bits ha1 through ha8 of the delayed horizontal address HA and the higher order eight bits va1 through va8 of the delayed vertical address VA as the bank A address. The selector circuit 34 selects the higher order seven bits ha2 through ha8 of the horizontal address HA and the higher order seven bits va2 through va8 of the vertical address VA as the bank B address, and the higher order seven bits ha2 through ha8 of the delayed horizontal address HA and the higher order seven bits va2 through va8 of the delayed vertical address VA as the bank A address.

The bank A address and bank B address selected in the selector circuits 32 through 34 are respectively fed to the bank A address terminals and bank B address terminals of the first layer memory 2, second layer memory 3 and third layer memory 4.

In the selector circuit 41, the bank B data terminal of the first layer memory 2 is connected to the read section 44 while the bank A data terminal is connected to the read section 45. In the selector circuit 42, the bank B data terminals of the second layer memory 3 are connected to the write section 46 and read section 47 while the bank A data terminals are connected to the write section 48 and read section 49. In the selector circuit 43, the bank B data terminals of the third layer memory 4 are connected to the write section 50 and read section 51 while the bank A data terminals are connected to the write section 52 and read section 53.

The process, identical to the above process but with the bank A and the bank B interchanged in the above discussion, is performed.

The first layer pixels are output by the selector circuit 58 while the storage content in the second layer memory 3 and third layer memory 4 is rewritten to the original values.

FIG. 8 shows the construction of the storage device of FIG. 1 to read the image in the second layer when the first layer memory 2 and second layer memory 3 are arranged to have a smaller memory capacity as already described. As shown in FIG. 8, a portion related to the first layer memory 2 is omitted.

The address providing circuit 1 is constructed of a delay circuit 71 and selector circuits 73 and 74. The delay circuit 71 and selector circuits 73 and 74 are identical in construction to the delay circuit 31 and selector circuits 33 and 34 respectively in FIG. 6.

The second layer memory 3 and third layer memory 4 are identical in construction to the respective ones shown in FIG. 6.

The RMW circuit 5 is constructed of selector circuits 81 and 82, read sections 84 and 85, write section 86, read section 87, write section 88, read section 89, switches 91 and 92, arithmetic units 94 and 95, selector circuit 98, and AND gates 99 and 100.

Bank A data and bank B data respectively read from the bank A and bank B in the second layer memory 3 are output to a bank A data terminal and bank B data terminal, which are connected to the selector circuit 81. The selector circuit 81 receives the lower order third bit va2 of the vertical address VA from the address providing circuit 1 as a control signal. In response to the control signal va2, the selector circuit 81 connects one of the bank A data terminal and the bank B data terminal to the read section 84 and the other of the bank A data terminal and the bank B data terminal to the read section 85.

When the control signal va2 transitions at one point with the selector circuit 81 connecting the bank A data terminal and bank B data terminal respectively to the read section 84 and read section 85, the bank A data terminal and bank B data terminal are reconnected to the read section 85 and the read section 84, respectively. When the control signal va2 transitions again, the selector circuit 81 connects again the bank A data terminal and bank B data terminal to the read section 84 and read section 85, respectively. Each time the control signal va2 transitions, the selector circuit 81 alternates the connection of the bank A data terminal to between the read section 84 and read section 85 while alternating the connection of the bank B data terminal to between the read section 85 and read section 84.

Connected to the selector circuit 82 are a bank A data terminal to which the data to be written onto the bank A in the third layer memory 4 is fed, a bank A data terminal from which the data read from the bank A is output, a bank B data terminal to which the data to be written onto the bank B is fed, and a bank B data terminal from which the data read from the bank B is output. The selector circuit 82 is also provided with the lower order third bit va2 of the vertical address VA from the address providing circuit 1 as a control signal. In response to the control signal va2, the selector circuit 82 connects ones of the bank A data terminals and the bank B data terminals to a write section 86 and a read section 87 while connecting the other of the bank A data terminals and the bank B data terminals to a write section 88 and a read section 89.

When the control signal va2 transitions at one point with the selector circuit 82 connecting the bank A data terminals to the write section 86 and read section 87 and the bank B data terminals to the write section 88 and read section 89, the bank A data terminals are reconnected to the write section 88 and read section 89 while the bank B data terminals are reconnected to the write section 86 and read section 87. When the control signal va2 transitions again, the selector circuit 82 connects again the bank A data terminals to the write section 86 and read section 87 while connecting the bank B data terminals to the write section 88 and read section 89. Each time the control signal va2 transitions, the selector circuit 82 alternates the connection of the bank A data terminals to between the write section 86 and read section 87, and the write section 88 and read section 89 while alternating the connection of the bank B data terminals to between the write section 88 and read section 89 and the write section 86 and read section 87.

The read sections 84 and 85 read data from the second layer memory 3 via the selector circuit 81. The data read by the read section 84 is fed to the terminal 91b of the switch 91 and the selector circuit 98. The data read by the read section 85 is fed to the terminal 92b of the switch 92. The write section 86 writes the output of the arithmetic unit 94 onto the third layer memory 4 via the selector circuit 82. The read section 87 reads data from the third layer memory 4 via the selector circuit 82, and feeds the data to the arithmetic unit 94 and the selector circuit 98. The write section 88 writes the output of the arithmetic unit 95 onto the third layer memory 4 via the selector circuit 82. The read section 89 reads data from the third layer memory 4 via the selector circuit 82, and feeds the data to the arithmetic unit 95.

Depending on the output of the AND gate 99, the switch 91 selects between its terminal 91a and terminal 91b, and its output is fed to the arithmetic unit 94. The terminal 91b is supplied with a 0. Depending on the output of the AND gate 99, the switch 92 selects between its terminal 92a and 92b, and its output is fed to the arithmetic unit 95. The terminal 92b is supplied with a 0.

The arithmetic unit 94 subtracts the output of the switch 91 from the output of the read section 87, and feeds the difference to the write section 86. The arithmetic unit 95 sums the output of the read section 89 and the output of the switch 92, and feeds the sum to the write section 88.

The selector circuit 98 selects one of the outputs of the read section 84 and read section 87 in response to the outputs of AND gates 99 and 100. The AND gate 99 receives the least significant bit ha0 of the horizontal address HA and the least significant bit va0 of the vertical address VA from the address providing circuit 1 as control signals, computes their logical product and feeds it to the selector circuit 98, and switches 91 and 92. The AND gate 100 receives the lower order second bit ha1 of the horizontal address HA and the lower order second bit va1 of the vertical address VA supplied to the address providing circuit 1 as a control signal, and computes their logical product and feeds it to the selector circuit 98.

The operation of the storage device is now discussed.

Suppose now that the horizontal address HA and the vertical address VA are selected as the bank A address and the delayed horizontal address HA and the delayed vertical address VA are selected as the bank B address in the selector circuit 73 and selector circuit 74.

Specifically, the selector circuit 73 selects the higher order eight bits ha1 through ha8 of the horizontal address HA and the higher order eight bits va1 through va8 of the vertical address VA as the bank A address, and the higher order eight bits ha1 through ha8 of the delayed horizontal address HA and the higher order eight bits va1 through va8 of the delayed vertical address VA as the bank B address. The selector circuit 74 selects the higher order seven bits ha2 through ha8 of the horizontal address HA and the higher order seven bits va2 through va8 of the vertical address VA as the bank A address, and the higher order seven bits ha2 through ha8 of the delayed horizontal address HA and the higher order seven bits va2 through va8 of the delayed vertical address VA as the bank B address.

The bank A address and bank B address selected in the selector circuits 73 and 74 are respectively fed to the bank A address terminals and bank B address terminals of the second layer memory 3 and third layer memory 4.

In the selector circuit 81, the bank A data terminal of the second layer memory 3 is connected to the read section 84 while the bank B data terminal is connected to the read section 85. In the selector circuit 82, the bank A data terminals of the third layer memory 4 are connected to the write section 86 and read section 87 while the bank B data terminals are connected to the write section 88 and read section 89.

The read section 84 reads, via the selector circuit 81, the second layer pixel (pixel value) stored at the bank A address in the second layer memory 3 output by the selector circuit 73 and feeds it to the terminal 91b of the switch 91 and the selector circuit 98.

The selector circuit 98 selects and outputs the output of the read section 84 as a second layer pixel when the output of the AND gate 99 only (of the outputs of the AND gates 99 and 100) is a 1. Specifically, that the output of the AND gate 99 is a 1 means that both ha0 and va0 are 1's with ha1 and/or va1 being a 0, and means the timing the bottom right pixel h(2s+1,2t+1) (excluding h(4m+3,4t+3)), out of the four pixels 2×2 of h(2s,2t), h(2s+1,2t), h(2s,2t+1), and h(2s+1,2t+1) in the first layer represented by D1 as shown in FIG. 2 is read.

At the timing each of the four pixels 2×2 of h(2s,2t), h(2s+1,2t), h(2s,2t+1), and h(2s+1,2t+1) in the first layer is accessed, the second layer pixel m(s,t) is also accessed. At the timing each of the four pixels 2×2 of h(2s,2t), h(2s+1,2t), h(2s,2t+1), and h(2s+1,2t+1) in the first layer is accessed, the data read from the second layer memory 3, namely, the second layer pixel m(s,t), is output, and in this case, the same pixel is output four times repeatedly.

The selector circuit 98 selects and outputs the output of the read section 84, namely, the second layer pixel m(s,t) at the timing the bottom right pixel h(2s+1,2t+1) (excluding h(4m+3,4t+3)), out of the four pixels 2×2 of h(2s,2t), h(2s+1,2t), h(2s,2t+1), and h(2s+1,2t+1) in the first layer is read.

For the same reason, the switch 91 selects the terminal 91b only at the timing the read section 84 outputs the first layer pixel h(2s+1,2t+1)(at the timing the output of the AND gate 99 is transitioned to a 1), and selects the terminal 91a in the remainder of the time. Specifically, the second layer pixel m(s,t) output by the read section 84 is fed to the arithmetic unit 94 only at the timing the bottom right pixel h(2s+1,2t+1), out of the four pixels 2×2 of h(2s,2t), h(2s+1,2t), h(2s,2t+1), and h(2s+1,2t+1) in the first layer is read, and a 0 is fed to the read section 94 in the remainder of the time.

The read section 87 reads, via the selector circuit 82, the third layer pixel (pixel value) stored at the bank A address output by the selector circuit 74, and feeds it to both the arithmetic unit 94 and selector circuit 98.

At the timing each of the addresses (4m,4n), (4m+1,4n), (4m+2,4n), (4m+3,4n), (4m,4n+1), (4m+1,4n+1),
(4m+2,4n+1), (4m+3,4n+1), (4m,4n+2), (4m+1,4n+2), (4m+2,4n+2), (4m+3,4n+2), (4m,4n+3), (4m+1,4n+3), (4m+2,4n+3), and (4m+3,4n+3)

in the first layer memory is accessed, the read section 87 reads the data from the bank address in the third layer memory 4 and feeds it to the arithmetic unit 94.

From the above discussion, the switch 91 selects the terminal 91b at the timing an access is made to each of addresses (4m,4n), (4m+1,4n), (4m+2,4n), (4m+3,4n), (4m,4n+1), (4m+2,4n+1), (4m,4n+2), (4m+1,4n+2), (4m+2,4n+2), (4m+3,4n+2), (4m,4n+3), and (4m+2,4n+3), excluding addresses (4m+1,4n+1), (4m+3,4n+1), (4m+1,4n+3), and (4m+3,4n+3) corresponding to address (2s+1,2t+1) in the first layer memory 2. In this case, the arithmetic unit 94 subtracts 0 from the data read from the bank A address (m,n) in the third layer memory 4, and the difference, namely, the data itself read from the bank A address in the third layer memory 4 is fed to the write section 86. The write section 86 writes, via the selector circuit 82, the data from the arithmetic unit 94 onto the bank A address (m,n) in the third layer memory 4. The value stored at the bank A address (m,n) in the third layer memory 4 remains unchanged from the immediately prior one.

At the timing each of addresses (4m+1,4n+1), (4m+3,4n+1), and (4m+1,4n+3) in the first layer memory 2 is accessed, the switch 91 selects the terminal 91b. In this case, the read section 84 reads each of the second layer pixels m(2m,2n), m(2m+1,2n), and m(2m,2n+1) from the second layer memory 3, and feeds it to the arithmetic unit 94 via the switch 91.

The arithmetic unit 94 subtracts the output of the read section 84 from the output of the read section 87, and feeds the difference to the write section 86. The write section 86 writes the output of the arithmetic unit 94 onto the bank A address (m,n) in the third layer memory 4 via the selector circuit 82.

The bank A address (m,n) in the third layer memory 4 initially stores the sum of the 16 pixels of 4×4 of h(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), and h(4m+3,4n+3)

in the first layer, namely, the pixel q(m,n) in the third layer, which is the sum of the four pixels of 2×2 of m(2m,2n), m(2m+1,2n), m(2m,2n+1), and m(2m+1,2n+1) in the second layer, and the arithmetic unit 94 receives the second layer pixel m(2m,2n) from the read section 84 via the switch 91 at the timing the address (4m+1,4n+1) in the first layer memory 2 is accessed while receiving, from the read section 87, the data (here, q(m,n)) stored at the bank A address in the third layer memory 4.

The arithmetic unit 94 determines difference (q(m,n)−m(2m,2n)) therebetween, and the write section 86 writes it onto the bank A address (m,n) in the third layer memory 4.

At the timing the address (4m+3,4n+1) in the first layer memory 2 is accessed, the arithmetic unit 94 receives the second layer pixel m(2m+1,2n+1) from the read section 84 via the switch 91 while receiving, from the read section 87, the data (here, q(m,n)−m(2m,2n)) stored at the bank A address (m,n) in the third layer memory 4.

The arithmetic unit 94 determines difference (q(m,n)−m(2m,2n)−m(2m+1,2n)) therebetween, and the write section 86 writes it onto the bank A address (m,n) in the third layer memory 4.

At the timing the address (4m+1,4n+3) in the first layer memory 2 is accessed, the arithmetic unit 94 receives the second layer pixel m(2m,2n+1) from the read section 84 via the switch 91 while receiving, from the read section 87, the data (here, q(m,n)−m(2m,2n)−m(2m+1,2n)) stored at the bank A address (m,n) in the third layer memory 4.

The arithmetic unit 94 determines difference (q(m,n)−m(2m,2n)−m(2m+1,2n)−m(2m,2n+1)) therebetween, and the write section 86 writes it onto the bank A address (m,n) in the third layer memory 4.

Written onto the bank A address (m,n) in the third layer memory 4 is thus the second layer pixel m(2m+1,2n+1)(= q(m,n)−m(2m,2n)−m(2m+1,2n)−m(2m,2n+1)).

At the timing the bank A address (4m+3,4n+3) in the first layer memory 2 (namely, at the timing the bank A address (2m+1,2n+1) in the second layer memory 3 is accessed; there is no memory cell corresponding to this address, and even if an attempt is made to access this address, nothing is written thereon and nothing is read therefrom) is accessed, the read section 87 reads, from the bank A address (m,n) in the third layer memory 4, the sum (m(2m+1,2n+1) in the second layer) of the right bottom pixels of 2×2 of h(4m+2,4n+2), h(4m+3,4n+2), h(4m+2,4n+3), and h(4m+3,4n+3) out of the 16 pixels of 4×4 in the first layer represented by D2 in FIG. 2.

The selector circuit 98 selects and outputs the output of the read section 51 as a second layer pixel when the outputs of two AND gates 99 and 50 are 1's. Specifically, that the output of the two AND gates 99 and 50 is a 1 means that all of ha0, va0, ha1, and va1 are 1's, and means the timing the address (4m+3,4n+3) in the first layer memory 2 is accessed. As already described, the data the read section 87 reads from the bank A address (m,n) in the third layer memory 4 at this timing is the second layer pixel (2m+1,2n+1), and this data is selected and output by the selector circuit 98.

When the second layer pixel is read in this way, the third layer memory 4 stores the second layer pixel m(2m+1,2n+1) in the same way as shown in FIG. 6.

Specifically, the second layer pixel is written, replacing the third layer pixel in the third layer memory.

The value stored in the third layer memory 4 in this way needs to be restored to the original third layer pixel.

When the horizontal address HA and the vertical address VA are selected as the bank A address with the delayed horizontal address HA and the delayed vertical address VA selected as the bank B address, the bank A memory cell for the horizontal address HA and the vertical address VA in the first layer memory 2 is accessed while at the same time an access is made to the bank B memory cell for the delayed horizontal address HA and the delayed vertical address VA, both of which were accessed four lines earlier.

In the second layer memory 3, the bank A memory cell is accessed while the bank B memory cell, which was accessed two lines earlier, is accessed at the same time. In the third layer memory 4, the bank A memory cell is accessed while the bank B memory cell, which was accessed one line earlier, is accessed.

When the read section 84 reads, from the bank A in the second layer memory 3, each of the second layer pixels m(2m,2n), m(2m+1,2n), and m(2m,2n+1), the read section 85 reads, from the bank B in the second layer memory 3, each of the second layer pixels m(2m,2n'), m(2m+1,2n') and m(2m,2n'+1), respectively, and feeds it to the terminal 92b of the switch 92. Here, n'=n−1.

Like the switch 91, the switch 92 is designed to select its terminal 92b only at the timing the read section 84 outputs the first layer pixel h(2s+1,2t+1) (at the timing the output of the AND gate 99 is transitioned to a 1), and selects its terminal 92*a* in the remainder of the time. The arithmetic unit 95 is supplied with the second layer pixel output by the read section 85 only at the timing the bottom right h(2s+1, 2t+1), out of the first layer four pixels of 2×2 of h(2s,2t), h(2s+1,2t), h(2s,2t+1), and h(2s+1,2t+1) is read, and is supplied with a 0 in the remainder of the time.

When the read section 85 reads, from the bank B in the second layer memory 3, each of the second layer pixels m(2m,2n'), m(2m+1,2n'), and m(2m,2n'+1), the read section 89 reads the data from the bank B address (m,n') in the third layer memory 4 via the selector circuit 82, and feeds it to the arithmetic unit 95.

The arithmetic unit 95 sums the output of the read section 85 and the output of the read section 89, and feeds the sum to the write section 88. The write section 88 writes the output of the arithmetic unit 95 onto the bank B address (m,n') in the third layer memory 4 via the selector circuit 82.

The bank B address (m,n') in the third layer memory 4 initially stores the second layer pixel m(2m+1,2n'+1) that was determined by accessing it in the second layer by two lines earlier (four lines earlier for the first layer). As the read section 85 reads the second layer pixel m(2m,2n') from the bank B in the second layer memory 3, the read section 89 reads the data (here, the second layer pixel m(2m+1,2n'+1)) stored at the bank B address (m,n') in the third layer memory 4. The arithmetic unit 95 determines the sum of these (m(2m,2n')+m(2m+1,2n'+1)), and the write section 88 writes it onto the bank B address (m,n') in the third layer memory 4.

As the read section 85 reads the second layer pixel m(2m+1,2n') from the bank B in the second layer memory 3, the read section 89 reads the data (here, m(2m,2n')+m(2m+1,2n'+1)) stored at the bank B address (m,n') in the third layer memory 4. The selector circuit 98 determines the sum of these (m(2m,2n')+m(2m+1,2n')+m(2m+1,2n'+1)), and the write section 88 writes it onto the bank B address (m,n') in the third layer memory 4.

As the read section 85 reads the second layer pixel m(2m,2n'+1) from the bank B in the second layer memory 3, the read section 89 reads the data (here, m(2m,2n')+m(2m+1,2n')+m(2m+1,2n'+1)) stored at the bank B address (m,n') in the third layer memory 4. The selector circuit 95 determines the sum of these (m(2m,2n')+m(2m+1,2n')+m(2m,2n'+1)+m(2m+1,2n'+1)), and the write section 88 writes it onto the bank B address (m,n') in the third layer memory 4. Specifically, the bank B address (m,n') in the third layer memory 4 stores the original third layer pixel $$q(m,n')(=m(2m,2n')+m(2m+1,2n')+m(2m,2n'+1)+m(2m+1,2n'+1)=h$$

(4m,4n), h(4m+1,4n), h(4m+2,4n), h(4m+3,4n), h(4m,4n+1), h(4m+1,4n+1), h(4m+2,4n+1), h(4m+3,4n+1), h(4m,4n+2), h(4m+1,4n+2), h(4m+2,4n+2), h(4m+3,4n+2), h(4m,4n+3), h(4m+1,4n+3), h(4m+2,4n+3), h(4m+3,4n+3)).

When the lower order third bit va2 of the vertical address VA transitions, the selections of the bank A address and bank B address are reversed in each of the selector circuits 73 and 74. Specifically, the selector circuit 73 selects the higher order eight bits ha1 through ha8 of the horizontal address HA and the higher order eight bits va1 through va8 of the vertical address VA as the bank B address, and the higher order eight bits ha1 through ha8 of the delayed horizontal address HA and the higher order eight bits va1 through va8 of the delayed vertical address VA as the bank A address. The selector circuit 74 selects the higher order seven bits ha2 through ha8 of the horizontal address HA and the higher order seven bits va2 through va8 of the vertical address VA as the bank B address, and the higher order seven bits ha2 through ha8 of the delayed horizontal address HA and the higher order seven bits va2 through va8 of the delayed vertical address VA as the bank A address.

The bank A address and bank B address selected in the selector circuits 73 and 74 are respectively fed to the bank A address terminals and bank B address terminals of the second layer memory 3 and third layer memory 4.

In the selector circuit 81, the bank B data terminal of the second layer memory 3 is connected to the read section 84 while the bank A data terminal is connected to the read section 85. In the selector circuit 82, the bank B data terminals of the third layer memory 4 are connected to the write section 86 and read section 87 while the bank A data terminals are connected to the write section 88 and read section 89.

The process, identical to the above process but with the bank A and the bank B interchanged in the above discussion, is performed.

The second layer pixels are output by the selector circuit 98 while the storage content in the third layer memory 4 is rewritten to the original values.

As described above, each of the first layer memory 2, second layer memory 3 and third layer memory 4 is divided into two banks, the bank A and the bank B, and by accessing the two banks in parallel, the pixels in the first layer and second layer are written, replacing the values stored in the second layer memory 3 and third layer memory 4 and the rewritten data is then restored back to the original data.

Specifically, the first layer pixel stored at the bank A address in the first layer memory 2, designated by the horizontal address HA and the vertical address VA, is read while the second layer pixel (first processed data) stored at the bank A address in the second layer memory 3, designated by part of the horizontal address HA and the vertical address VA, is read. By subtracting the first layer pixel from the second layer pixel, the first pixel (second processed data) is finally determined, and is written on the address in the second layer memory 3 that stored the second layer pixel. At the same time, the first layer pixel stored at the bank B address in the first layer memory 2, designated by the delayed horizontal address HA and the delayed vertical address VA, is read while the first layer pixel (the second processed data) stored at the bank B address in the second layer memory 3, designated by part of the delayed horizontal address HA and the delayed vertical address VA, is read. By summing these first layer pixels, the original second layer pixel (the first processed data) is determined and the value stored at the bank B address in the second layer memory 3, which is the first layer pixel, is then rewritten to the original second layer pixel.

Although each of the first layer memory 2, second layer memory 3 and third layer memory 4 is divided into two banks, the bank A and bank B in this embodiment, the bank partition is not limited to this method.

Although the summing and subtracting operations are performed to the data read from the bank A and the bank B in this embodiment, the processing of the data read from the bank A and the bank B is not limited to the summing and subtracting operations.

Although the second layer memory 3 and third layer memory 4 are accessed using the part of the horizontal address HA and the vertical address VA provided to the first layer memory 2 in this embodiment, the second layer memory 3 and third layer memory 4 may be accessed using a dedicated (independent) address different from the horizontal address HA and the vertical address VA provided to the first layer memory 2.

Although the first layer memory 2, second layer memory 3 and third layer memory 4 are accessed using the horizontal address and the vertical address corresponding to the horizontal position and the vertical position of each pixel for the image in this embodiment, the first layer memory 2, second layer memory 3 and third layer memory 4 may be accessed using an address corresponding to the direction of time. In such a case, the pixels in the second and third layers may be constituted by pixels distributed in the time direction as well as pixels distributed in a space expanding in a horizontal direction and a vertical direction.

The first layer memory 2, second layer memory 3 and third layer memory 4 are not necessarily constructed of their respective physical memories, and all these may be constructed of a single memory. In such a case, the first layer memory 2, second layer memory 3 and third layer memory 4 have their own memory areas in the single memory.

Although the address providing circuit 1, first layer memory 2, second layer memory 3 and third layer memory 4 and RMW circuit 5 are all arranged on a single chip in this embodiment, this is not a requirement.

Although the quantity of bits assigned to each pixel in the first layer is 8, and the data lengths of the memory cells in the first layer memory 2, second layer memory 3 and third layer memory 4 are respectively 8, 10 and 12 bits to prevent digit missing in this embodiment, the data lengths of the memory cells in the first layer memory 2, second layer memory 3 and third layer memory 4 may be all set to be 8 bits. In such a case, however, as for the pixels in the second and third layers, the value that is obtained by rounding down the lower order two bits of the sum of 2×2 pixels in the first and second layer (the value is identical to the one divided by 4, thus an average) is stored, and this results in digit missing, destroying data restorativeness.

When the memory capacity in the first layer memory 2 and second layer memory 3 is reduced with some of the first layer pixels and second layer pixels remaining not stored and digit missing prevented as described above, the pixels (pixel value) not stored in the first and second layer are correctly determined according to equations (1) and (2). On the other hand, when some of the pixels in the first layer and second layer are not stored with digit missing left uncured, the value of each of the pixels not stored in the first and second layer is not correctly determined any more.

The present invention may work in both a non-interlace-scanned image and an interlace-scanned image.

The number of layers, three in the above embodiment, may be two or four or more.

Although the sum of four pixels of 2×2 in the lower hierarchical layer forms a pixel (pixel value) in another layer by one layer higher than the lower layer in this embodiment, the method of forming the pixels in the higher hierarchical layer is not limited to this.

The present invention, though implemented employing hardware in this embodiment, may be implemented by allowing a program to execute the above-described process.

Although pixels (pixel values) are stored in a memory such as RAM (Random Access Memory) in the above-described embodiment, the pixels may be stored (written) onto a storage medium such as a magnetic disk, a magneto-optical disk, a magnetic tape, and an optical card.

According the storage device and access method, the first memory has addresses corresponding to pixels for input image data with its memory area divided into a plurality of blocks addressable on a block by block basis. The blocks of the first memory are concurrently addressed according to, at least, first and second address signals. The reading and writing operations are concurrently performed to addresses, designated by the first and second address signals, in the blocks in the first memory. This arrangement permits parallel processings to be performed in the plurality of blocks. As a result, the sum resulting from the summing of pixels on a plurality of lines of the input image data is restored back to the original input image data without the need for a line delay circuit.

The above described preferred embodiments are not intended to limit the scope of the present invention, and various modifications and changes may be incorporated without departing from the scope of the present invention.

What is claimed is:

1. A storage device for storing an image, comprising:
   a first memory area which has addresses corresponding to pixels for input image data and which is divided into a plurality of blocks, wherein the blocks are addressable on a block by block basis;
   a second memory area having a smaller memory capacity than said first memory area, said second memory area being divided into the same number of blocks as the number of blocks included in said first memory area, wherein the blocks of said second memory area are addressable on a block by block basis;
   an addressing module for concurrently addressing the blocks of said first memory area according to at least first and second address signals, while concurrently addressing each block in said second memory area according to only part of said first and second address signals; and
   a read and write module for concurrently reading from addresses designated by said first and second address signals in the blocks of said first memory area, and for concurrently writing to addresses designated in the blocks in said first memory area designated by said first and second address signals.

2. A storage device according to claim 1, wherein said addressing module concurrently addresses corresponding locations in the blocks of said first memory area.

3. A storage device according to claim 1, wherein said read and write module determines the sum of data for a plurality of relatively high resolution pixels written in a plurality of addresses in said first memory area, corresponding to one address and one lower resolution pixel of said second memory area to write the sum onto the address of said second memory area as first image data derived from said input image data.

4. A storage device according to claim 1, wherein said first address signal and said second address signal respectively correspond to horizontal and vertical positions of a pixel for said input image data.

5. A storage device according to claim 1, wherein said second memory area has addresses corresponding to pixels for first image data derived from said input image data.

6. A storage device according to claim 1, further comprising a third memory area, wherein said first memory area stores relatively high resolution pixel data, said second memory area stores first lower resolution pixel data and said third memory area stores second lower resolution pixel data for pixels of reduced resolution relative to said first lower resolution data, said first and second lower resolution pixel data being derived from said input image data.

7. A storage device for storing an image, comprising:
a first memory which has addresses corresponding to pixels for input image data and a memory area which is divided into a plurality of blocks, wherein the blocks are addressable on a block by block basis;
a second memory which has addresses corresponding to pixels for first image data derived from said input image data and a memory area which is divided into the same number of blocks as the number of blocks included in said first memory, wherein the blocks of said second memory are addressable on a block by block basis;
an addressing module for concurrently addressing the blocks of said first memory according to at least first and second address signals corresponding to respective horizontal and vertical positions of a pixel of said input image data, while concurrently addressing each block in said second memory according to at least part of said first and second address signals; and
a read and write module for concurrently reading from addresses, designated by said first and second address signals, in the plurality of blocks in said first memory, and for concurrently writing from addresses in the plurality of blocks in said first memory designated by said first and second address signals;
wherein said first memory has a memory capacity corresponding to the value which is obtained by subtracting the number of addresses in said second memory from the number of pixels of one display screen for said input image data.

8. A storage device according to claim 7, wherein said read and write module reads said input image data stored at the address in said first memory, designated by said first and second address signals, while reading said first processed data stored at the address in said second memory, designated by part of said first and second address signals,
computes second data by processing both said input image data and said first processed data, and
writes said second processed data onto the address in said second memory which stored said first processed data.

9. A storage device according to claim 8, wherein said addressing module generates a predetermined address signal from said first and second address signals and performs addressing according to said predetermined address signal and said first and second address signals;
said read and write module reads said input image data stored at an address of a predetermined block in said first memory, designated by said first and second address signals while reading said first processed data stored at an address of the block in said second memory, designated by part of said first and second address signals and corresponding to the predetermined block in said first memory,
computes said second processed data by processing said input image data and said first processed data, and
writes said second processed data onto the address in said second memory which stored said first processed data,
while, at the same time, said read and write module reads said input image data stored in the other block in said first memory, designated by said predetermined address signal while reading said second processed data stored in the block in said second memory designated by part of said predetermined address signal, and corresponding to the other block in said first memory,
computes said first processed data by processing said input image data and said second processed data, and
writes said first processed data onto the address in said second memory which stored said second processed data.

10. A method of accessing a storage device for storing an image, wherein the storage device comprises a first memory area which has addresses corresponding to pixels for input image data and which is divided into a plurality of blocks, and wherein said blocks are addressable on a block by block basis, said method comprising:
concurrently addressing the blocks in said first memory area according to at least first and second address signals;
concurrently addressing blocks in a second memory area of said storage device having less memory capacity than said first memory area, according to only part of said first and second address signals;
concurrently writing to addresses designated by said first and second address signals, in the blocks in the first memory area; and,
concurrently reading from addresses designated by said first and second address signals, in the blocks in the first memory area.

11. A storage medium comprising:
a first memory area for storing less than a full display screen of only high resolution data;
at least a second memory area, separate from said first memory area and having less storage capacity than said first memory area, for storing an entire display screen of lower resolution data corresponding to said high resolution data;
wherein a full display screen of high resolution data is obtained from said storage medium by reading the high resolution data stored in said first memory area to obtain high resolution data for a first portion of the pixels of the full display screen, and reading the lower resolution data stored in at least the second memory area and converting the lower resolution data to high resolution data for a second portion of the pixels of the full display screen, said first and second portions being combined to obtain said full display screen of high resolution data.

12. The storage medium of claim 11 wherein each pixel of the lower resolution data corresponds to four pixels of the high resolution data, and said first portion of the pixels is three quarters of the pixels of a full display screen.

13. The storage medium of claim 11 wherein each of said first and second memory areas is divided into a plurality of concurrently accessible blocks.

14. The storage medium of claim 11, further comprising an addressing module that concurrently addresses blocks in the first memory area according to first and second address signals, and concurrently addresses blocks in the second memory area according to only part of the same first and second address signals used to address said blocks in the first memory area.

* * * * *